US012802466B2

(12) United States Patent
Cho et al.

(10) Patent No.: US 12,802,466 B2
(45) Date of Patent: Nov. 17, 2026

(54) APPARATUS FOR MONITORING PET IN VEHICLE, VEHICLE COMPRISING SAME, AND VEHICLE OPERATING METHOD

(71) Applicant: LG ELECTRONICS INC., Seoul (KR)

(72) Inventors: Sungil Cho, Seoul (KR); Jaehoon Cho, Seoul (KR); Jaehyun Park, Seoul (KR); Chiwon Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 164 days.

(21) Appl. No.: 18/869,081

(22) PCT Filed: May 26, 2022

(86) PCT No.: PCT/KR2022/007476
§ 371 (c)(1),
(2) Date: Nov. 25, 2024

(87) PCT Pub. No.: WO2023/229064
PCT Pub. Date: Nov. 30, 2023

(65) Prior Publication Data
US 2025/0322672 A1 Oct. 16, 2025

(51) Int. Cl.
*G06V 20/59* (2022.01)
*G06V 20/40* (2022.01)
*G10K 11/178* (2006.01)

(52) U.S. Cl.
CPC .............. *G06V 20/59* (2022.01); *G06V 20/44* (2022.01); *G10K 11/178* (2013.01)

(58) Field of Classification Search
CPC ....... G06V 20/59; G06V 20/44; G10K 11/178
USPC .......................................................... 382/104
See application file for complete search history.

(56) References Cited

FOREIGN PATENT DOCUMENTS

| | | | |
|---|---|---|---|
| JP | 2004-330965 | A | 11/2004 |
| JP | 2008-149857 | A | 7/2008 |
| KR | 10-2019-0014733 | A | 2/2019 |
| KR | 10-2022-0027242 | A | 3/2022 |

(Continued)

OTHER PUBLICATIONS

Seng Yeap, Wei, et al. "A novel vehicular heatstroke prevention by smart hvac system model." Journal of Physics: Conference Series. vol. 1755. No. 1. IOP Publishing, 2021. (Year: 2021).*

*Primary Examiner* — Jonathan S Lee
(74) *Attorney, Agent, or Firm* — Birch, Stewart, Kolasch & Birch, LLP

(57) ABSTRACT

An apparatus for monitoring a pet in a vehicle, a vehicle comprising same, and a vehicle operating method are disclosed. The apparatus for monitoring a pet in a vehicle, according to the present invention, receives a signal corresponding to a preset input so as to operate a pet mode in which sensors provided inside and outside the vehicle are used to monitor the movement of the pet in the vehicle and whether a vehicle-adjacent object is approaching. At this time, an active noise cancellation (ANC) function is activated in order to improve pet comfort, state information corresponding to pet movement can be transmitted to a registered external terminal, and learning is performed on the basis of pet reactions to various corresponding situation-specific operations, and thus a customized pet care service is provided even without the presence of a guardian.

17 Claims, 15 Drawing Sheets

(56) References Cited

FOREIGN PATENT DOCUMENTS

| | | |
|---|---|---|
| KR | 10-2022-0027536 A | 3/2022 |
| KR | 10-2022-0050280 A | 4/2022 |

* cited by examiner (a)

(b)

APPARATUS FOR MONITORING PET IN VEHICLE, VEHICLE COMPRISING SAME, AND VEHICLE OPERATING METHOD

CROSS-REFERENCE TO RELATED APPLICATIONS

This application is the National Stage filing under 35 U.S.C. 371 of International Application No. PCT/KR2022/007476, filed on May 26, 2022, which is hereby expressly incorporated by reference into the present application.

TECHNICAL FIELD

The present disclosure relates to an in-vehicle pet monitoring device, a vehicle including the in-vehicle pet monitoring device, and a method of operating the vehicle. More particularly, the present disclosure relates to an in-vehicle pet monitoring device, a vehicle including the in-vehicle pet monitoring device, and a method of operating the vehicle, all of which are capable of monitoring a pet's movement using a sensor inside the vehicle and providing state information, resulting from the monitoring, to the outside.

BACKGROUND ART

For safety and convenience of a user who uses a vehicle, various sensors and devices are provided in the vehicle, and the vehicle's functions are expanded. The vehicle's functions may include a convenience function for enhancing the driver's convenience, and a safety function for enhancing the safety of the driver and/or pedestrian.

In recent years, there has been a growing trend of people driving with a pet in the vehicle for traveling, camping, or other purposes. In some cases, in a state where the vehicle is parked or stopped, the pet is left alone within the vehicle while a guardian of the pet moves away from the vehicle. For example, in some cases, a driver with a pet in the vehicle parks so the driver or an occupant (hereinafter referred to as 'guardian') can go to a restroom, buy necessary goods at a place where pets are not allowed to enter, or handle an urgent matter.

The longer the pet is left alone within the vehicle, the more anxious the pet becomes. Accordingly, there is a known technology that intentionally operates a pet mode or companion animal mode (hereinafter referred to as 'pet mode') after a guardian leaves the vehicle, in order to provide an optimal environment for a pet left alone within a vehicle. The known pet mode is for maintaining a preset temperature within a vehicle and is executed on the basis of a user input.

However, in the state where the vehicle is parked or stopped, the guardian may leave the vehicle without setting the pet mode. The guardian may later forget to set the pet mode. Furthermore, even if the optimal temperature is set within the vehicle, the pet's anxious state may continue, and the pet may be left alone within the vehicle for a long time. The known pet mode cannot handle these various situations. Particularly, pets are more sensitive to an external environment or noise than humans. In this respect, suitable situation-based interventions are required.

DISCLOSURE OF INVENTION

Technical Problem

Objects of the present disclosure are to address the above-mentioned problems and other problems.

One object of one or several embodiments of the present disclosure is to provide an in-vehicle pet monitoring device, a vehicle including the in-vehicle pet monitoring device, and a method of operating the vehicle, all of which are capable of providing pet care, considering various situations inside and outside the vehicle in a state where a pet is left alone within the vehicle.

Another object of one or several embodiments of the present disclosure is to provide an in-vehicle pet monitoring device, a vehicle including the in-vehicle pet monitoring device, and a method of operating the vehicle, all of which are capable of safely providing pet care even in a case where a pet is left alone within the vehicle and where a pet mode is not executed.

Still another of one or several embodiments of the present disclosure is to provide an in-vehicle pet monitoring device, a vehicle including the in-vehicle pet monitoring device, and a method of operating the vehicle, all of which are capable of performing various situation-based intervention operations and providing a tailored pet care service by learning from these operations in a case where a pet is left alone within the vehicle and where the pet's anxious state continues while a pet mode is executed.

Solution to Problem

To this end, an in-vehicle pet monitoring device according to the present disclosure is embodied such that a pet mode for monitoring a pet's movement within a vehicle using a sensor of the vehicle is executed on the basis of a preset input, an active noise cancellation (ANC) function is activated to improve the pet's relaxation, and state information corresponding to the pet's movement is transmitted to an external device that is registered.

According to one aspect of an embodiment of the present disclosure, there is provided a vehicle including: a sensor that is provided inside the vehicle and monitors a pet's movement; a noise control module that controls the operation of an active noise cancellation (ANC) function equipped in the vehicle; a communication module for communicating with an external terminal that is registered; output modules that are provided in the interior and on the exterior of the vehicle, respectively; and a processor that, on the basis of a preset input in a state where the vehicle is parked or stopped, activates the sensor and executes a pet mode for monitoring the pet's state. In the vehicle, the processor determines, based on the result of the monitoring by the sensor in the pet mode, that an amount of change in the pet's movement reaches or exceeds a reference range, controls the noise control module in such a manner as to activate the ANC function on the basis of the determination, and transmits state information corresponding to the pet's movement to the external terminal through the communication module.

In an embodiment, in the vehicle, the processor may activate the sensor in a locked state of the vehicle and, in response to detection of the pet's movement based on the result of the monitoring by the sensor, may transmit alert information to the external terminal.

In an embodiment, in the vehicle, when a response signal to the alert information is received through the communication module, the processor may maintain an activated state of the sensor and may execute the pet mode.

In an embodiment, in the vehicle, when the pet mode is executed, the processor may actively control an operation of turning on or off an internal air-conditioning system for maintaining the temperature inside the vehicle within a predetermined range and an operation of turning on or off the ANC function for maintaining a noise level within a predetermined range.

In an embodiment, in the vehicle, the sensor may be an internal camera of the vehicle, and the processor may recognize the pet from images collected through the internal camera using a pre-trained model that operates in conjunction with a system, may compute the amount of change in the pet's movement on the basis of an amount of pix change for the recognized pet, and may determine the pet's state on the basis of the amount of change in the pet's movement and sound collected by a microphone provided inside the vehicle.

In an embodiment, in the vehicle, the processor may selectively operate a vehicular electronic component corresponding to the pet's state, on the basis of the pet's determined state and a pre-learned intervention event.

In an embodiment, the vehicle may further include a display that is provided inside the vehicle and on which at least one content item is displayed, and wherein, when the result of the monitoring by the sensor in the pet mode indicates that the amount of change in the pet's movement reaches or exceeds the reference range, the processor may execute control in such a manner that video content associated with the pet is displayed on the display.

In an embodiment, the vehicle may further include an external camera that is provided on the exterior of the vehicle and monitors an object's movement in the vicinity of the vehicle, wherein, when the result of the monitoring by the sensor in the pet mode indicates that the amount of change in the pet's movement reaches or exceeds the reference range, the processor may activate the external camera and, using the external camera, may monitor whether or not the object approaches the vehicle.

In an embodiment, in the vehicle, the processor may determine, on the basis of images collected through the external camera, that the object approaches the vehicle, may output sound, inducing the pet's relaxation, through a first output module provided inside the vehicle, on the basis of the determination, and may output information, indicating the execution of the pet mode in progress, through a second output module provided on the exterior of the vehicle, on the basis of the determination.

In an embodiment, in the vehicle, when the result of the monitoring by the sensor in the pet mode indicates that the amount of change in the pet's movement does not reach the reference range, the processor may maintain a deactivated state of the ANC function, and may transmit the state information corresponding to the pet's movement to the external terminal.

In an embodiment, in the vehicle, when the result of the monitoring by the sensor in the pet mode indicates that the amount of change in the pet's movement reaches or exceeds the reference range, the processor may collect the pet's sound by activating a microphone provided inside the vehicle, may determine, on the basis of the pet's collected sound and the amount of change in the pet's movement, that the pet is in an anxious state, and may request a call connection to the external terminal.

In an embodiment, the vehicle may further include a food dispenser that is provided inside the vehicle and communicates with the processor, wherein the processor may determine, based on the result of the monitoring by the sensor in the pet mode, that the pet is in a hungry state, may transmit a control signal for operating the food dispenser on the basis of the determination, and may output a voice inducing pet feeding by activating an audio output unit provided inside the vehicle.

In an embodiment, in the vehicle, in a case where the pet mode is executed on the basis of the preset input in a state where the vehicle travels, the processor may execute control in such a manner that the state information corresponding to the pet's movement is displayed on a display inside the vehicle.

According to another aspect of the embodiment of the present disclosure, there is provided a method of operating a vehicle, the method including: a step of receiving, by a processor provided inside the vehicle, a signal corresponding to a preset input in a state where the vehicle is parked or stopped; a step of activating a sensor for monitoring a pet's movement on the basis of the received signal and executing a pet mode for monitoring the pet's state; a step of determining, based on the result of the monitoring by the sensor in the pet mode, that an amount of change in the pet's movement reaches or exceeds a reference range; and a step of activating an active noise cancellation (ANC) function equipped in the vehicle on the basis of the determination and transmitting state information corresponding to the pet's movement to an external terminal that is registered.

In an embodiment, the method may further include, before the step of receiving the signal: a step of detecting a locked state of the vehicle and activating the sensor; a step of transmitting alert information to the external terminal in response to detection of the pet's movement based on the result of the monitoring by the sensor; and a step of maintaining an activated state of the sensor and executing the pet mode when a response signal to the alert information is received.

In an embodiment, the method may further include: a step of activating an external camera of the vehicle and thus monitoring whether or not an object in the vicinity of the vehicle approaches the vehicle, when the result of the monitoring by the sensor in the pet mode indicates that the amount of change in the pet's movement reaches or exceeds the reference range; a step of determining, on the basis of images collected through the external camera, that the object approaches the vehicle; and a step of outputting sound, inducing the pet's relaxation, through a first output module provided inside the vehicle on the basis of the determination and outputting information, indicating the execution of the pet mode in progress, through a second output module provided on the exterior of the vehicle on the basis of the determination.

According to still another aspect of the embodiment of the present disclosure, there is provided an in-vehicle pet monitoring device including: an interface unit that performs communication with at least one of components provided in a vehicle; and a processor that, on the basis of a preset input in a state where the vehicle is parked or stopped, activates a sensor for monitoring a pet's movement and executes a pet mode for monitoring the pet's state, wherein the processor determines, based on the result of the monitoring by the sensor in the pet mode, that an amount of change in the pet's movement reaches or exceeds a reference range, generates a control signal for activating an active noise cancellation (ANC) function equipped in the vehicle on the basis of the determination, transmits the generated control signal to the vehicle through the interface unit, and transmits state information corresponding to the pet's movement to an external device that is registered.

Advantageous Effects of Invention

The advantageous effects of an in-vehicle pet monitoring device, a vehicle including the in-vehicle pet monitoring device, and a method of operating the vehicle are described as follows.

According to one or several embodiments of the present disclosure, in response to execution of a pet mode in a state where a pet is left alone within the vehicle, the interior and surroundings of the vehicle can continue to be monitored, and a pet-friendly content screen, feeding, soothing sound, and the like, along with optimal temperature, fresh air, and an extraneous noise reduction function, can be provided inside the vehicle. In addition, these operations may be appropriately modified based on the result of monitoring the pet's current state and then provided. Thus, even while a guardian of the pet is not present, the pet can remain relaxed.

In addition, according to one or several embodiments of the present disclosure, in the state where the pet is left alone within the vehicle, in a case where the guardian of the pet unintentionally fails to set the pet mode, the pet's movement is detected, and thus the pet mode setting is triggered through a user terminal, or the pet is monitored to ensure at least the pet's safety. Consequently, the pet left alone within the vehicle can be safely protected.

In addition, according to one or several embodiments of the present disclosure, in a case where the pet is left alone within the vehicle and where the pet's anxious state continues while the pet mode is executed, the cause of the pet's anxious state is identified, and the pet's relaxation is achieved by performing an appropriate intervention operation for the interior and/or surroundings of the vehicle. Furthermore, learning is performed on the basis of the pet's response to the intervention operation. Consequently, tailored pet care may be provided thereafter.

MODE FOR THE INVENTION

Figure 1:
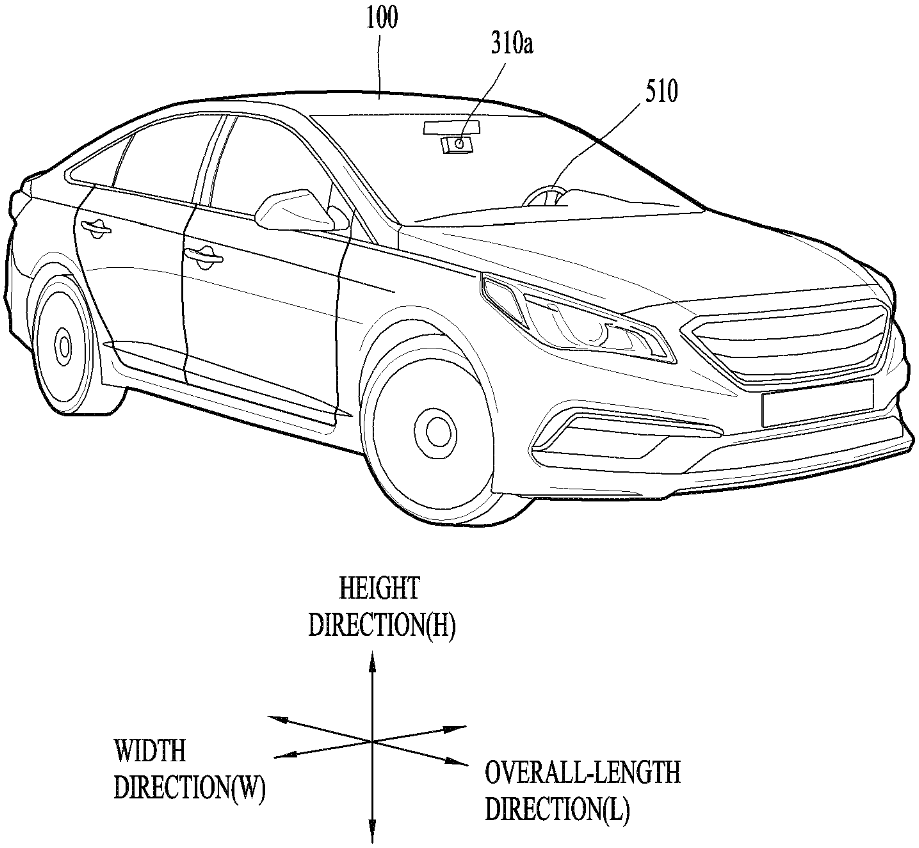
FIG. 1 is a view illustrating an example of a vehicle in accordance with an embodiment of the present disclosure.

Embodiments disclosed in the present specification will be described in detail below with reference to the accompanying drawings, and regardless of figure numbers, the same or similar constituent elements are given the same reference number and descriptions thereof are not repeated. The terms 'module' and 'unit' are hereinafter interchangeably or individually used to refer to a constituent element only for convenience in description in the present specification and therefore are not themselves intended to take on different meanings or to depict different functions. In addition, when describing the embodiments disclosed in the present specification, a detailed description of a related well-known technology will be omitted if it is determined that it would obscure the nature and gist of the present disclosure. In addition, the accompanying drawings are provided only to help easily understand the embodiments disclosed in the present specification. It should be understood that the technical idea disclosed in the present specification is not limited by the accompanying drawings. Furthermore, it should be understood that any alteration or equivalent of, or any substitute for, a constituent element in accordance with the embodiment of the present disclosure, which falls within the scope of the technical idea of the present disclosure, is included within the scope of the present disclosure.

The ordinal numbers first, second, and so forth may be used to describe various elements, but they do not limit these elements. These ordinal numbers are only used to distinguish one element from another.

It should be understood that a constituent element, when referred to as 'connected to' or 'have access to' a different constituent element, may be directly connected to or have direct access to the different constituent element or may be connected to or have access to the different constituent element, with a third constituent element in between. Likewise, it should be understood that a constituent element, when referred to as 'directly connected to' or 'have direct access to' a different constituent element, may be connected to or have access to the different constituent element without a third constituent element in between.

A noun in singular form has the same meaning as when used in its plural form, unless it has a different meaning in context.

The terms 'include,' 'have,' and the like, which are used in the present application, should be understood as indicating the presence of a feature, number, step, operation, constituent element, component, or combination thereof, without precluding the possibility of the presence or addition of one or more features, numbers, steps, operations, constituent constituents, components, or combinations thereof.

Examples of a vehicle described in the present specification may conceptually include automobiles and motorcycles. The vehicle will be described below with a focus placed on the automobile.

Examples of the vehicle described in the present specification may conceptually include all vehicles, such as internal combustion engine vehicles having an engine as a power source, hybrid vehicles having an engine and an electric motor as power sources, and electric vehicles having an electric motor as a power source.

In the following description, the left side of the vehicle refers to the left side in the traveling direction of the vehicle, and the right side of the vehicle refers to the right side in the traveling direction.

The term 'system' disclosed in the present specification may include at least one of the following: a server device or a cloud device, but is not limited thereto. For example, the system may be configured with one or more server devices. As another example, the system may be configured with one or more cloud devices. As still another example, the system may be configured with both the server device and the cloud device, allowing it to operate.

In the present specification, the term 'user terminal' or 'user client' refers to a computing device and/or system, such as a user terminal or a user, each of which communicates with a vehicle (such as an electronic component or device/system, each of which is provided in the vehicle) and an in-vehicle pet monitoring device.

In addition, a 'pet mode' may be executed for a pet's relaxation and safety when a pet is left alone within the vehicle in a state where the vehicle is parked or stopped. However, in one or several embodiments, to check the pet's relaxation and state, the pet mode may also be intentionally set and executed by an occupant while the vehicle travels.

Figure 2:
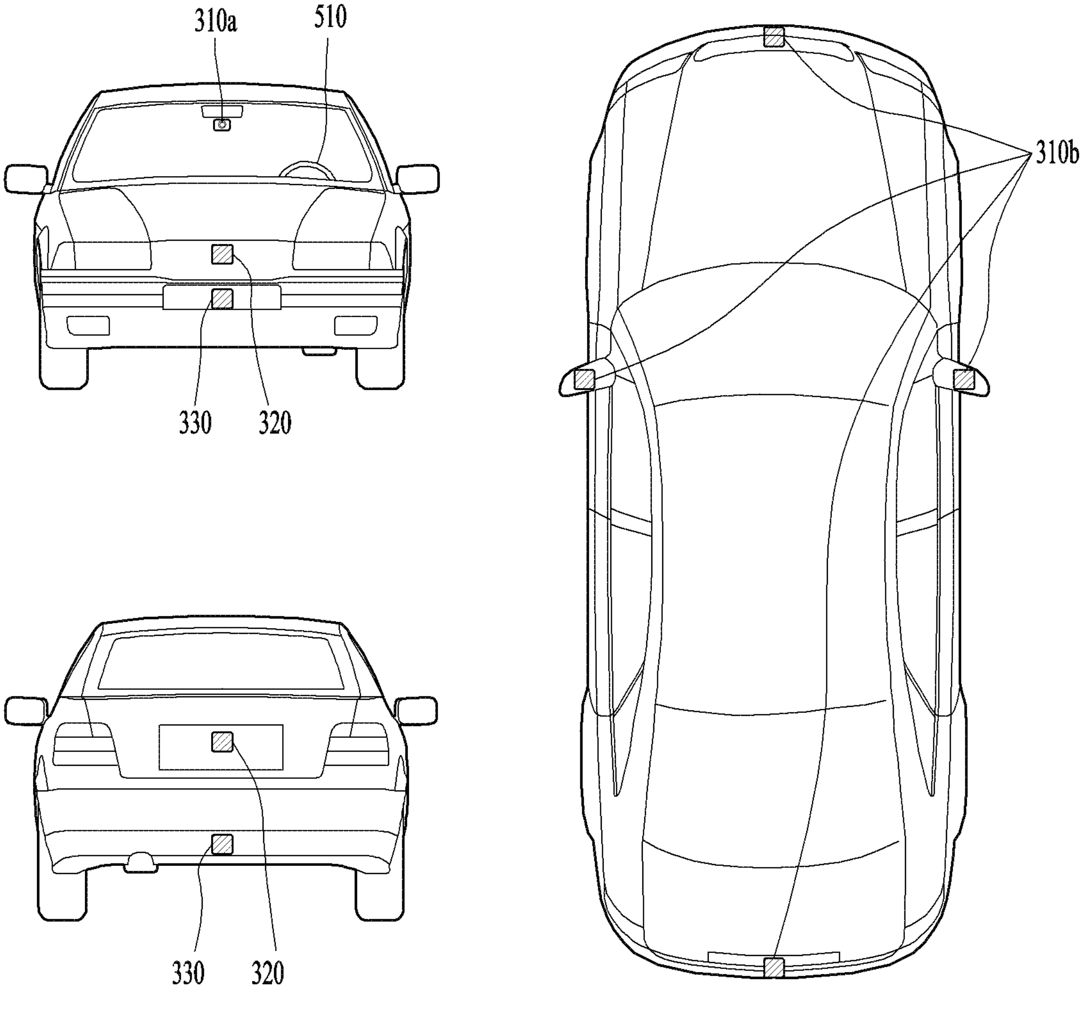
FIG. 2 is a set of views illustrating the vehicle in accordance with the embodiment of the present disclosure from various angles.
Figure 3:
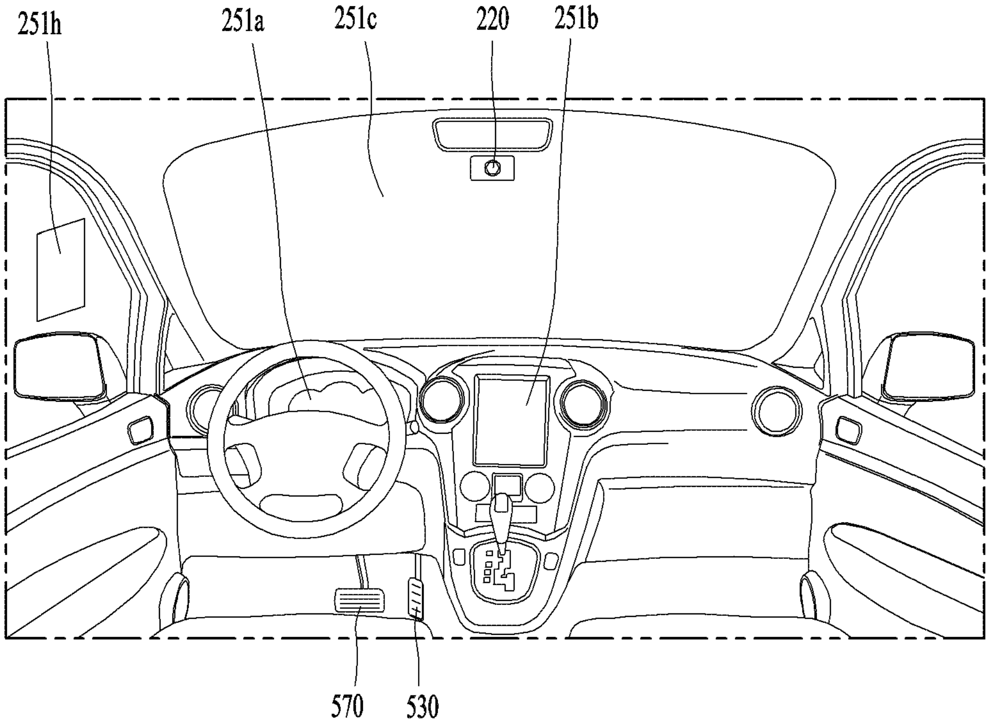
FIGS. 3 and 4 are views each illustrating the interior of the vehicle in accordance with the embodiment of the present disclosure.
Figure 4:
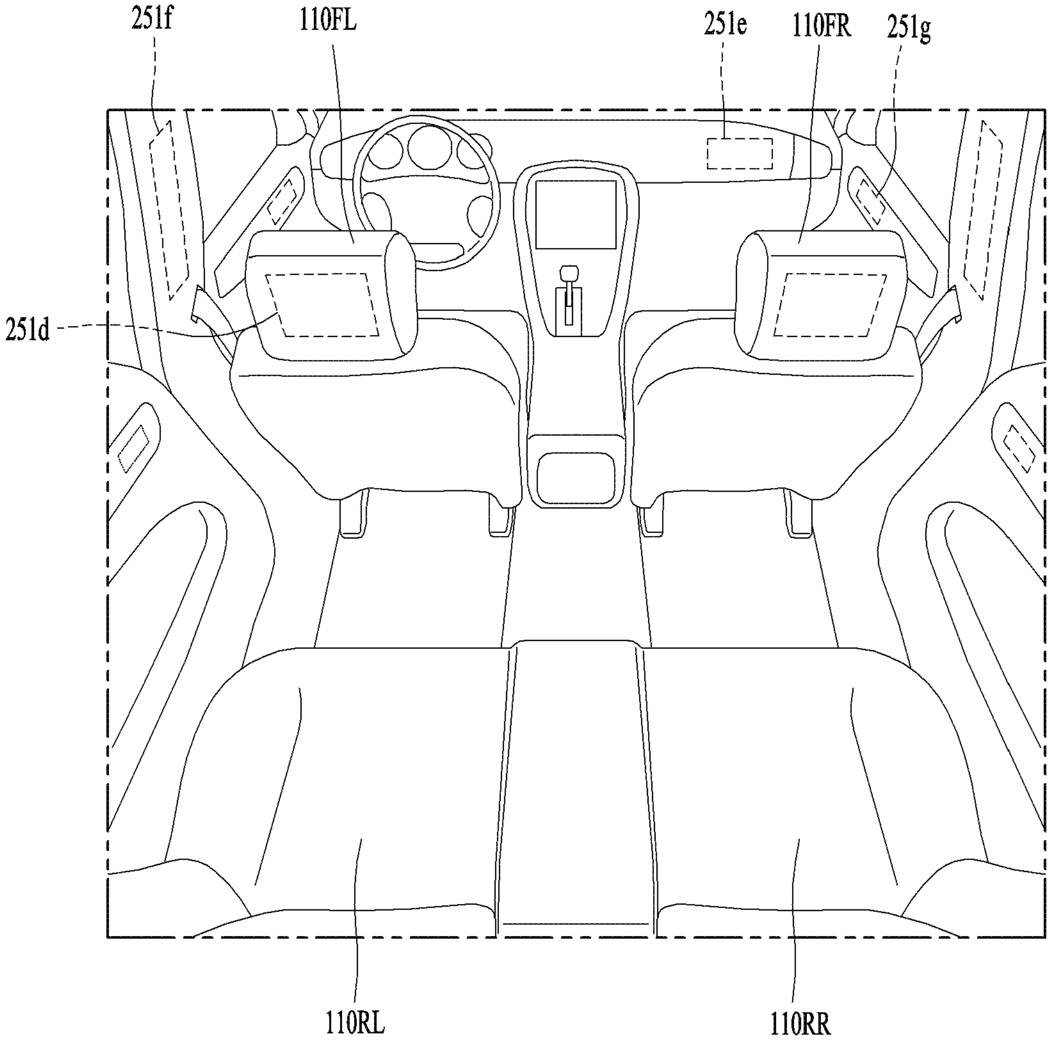

FIGS. 1 and 2 are views each illustrating the exterior of the vehicle in accordance with the embodiment of the present disclosure. FIGS. 3 and 4 are views each illustrating the interior of the vehicle in accordance with the embodiment of the present disclosure.

Figure 5:
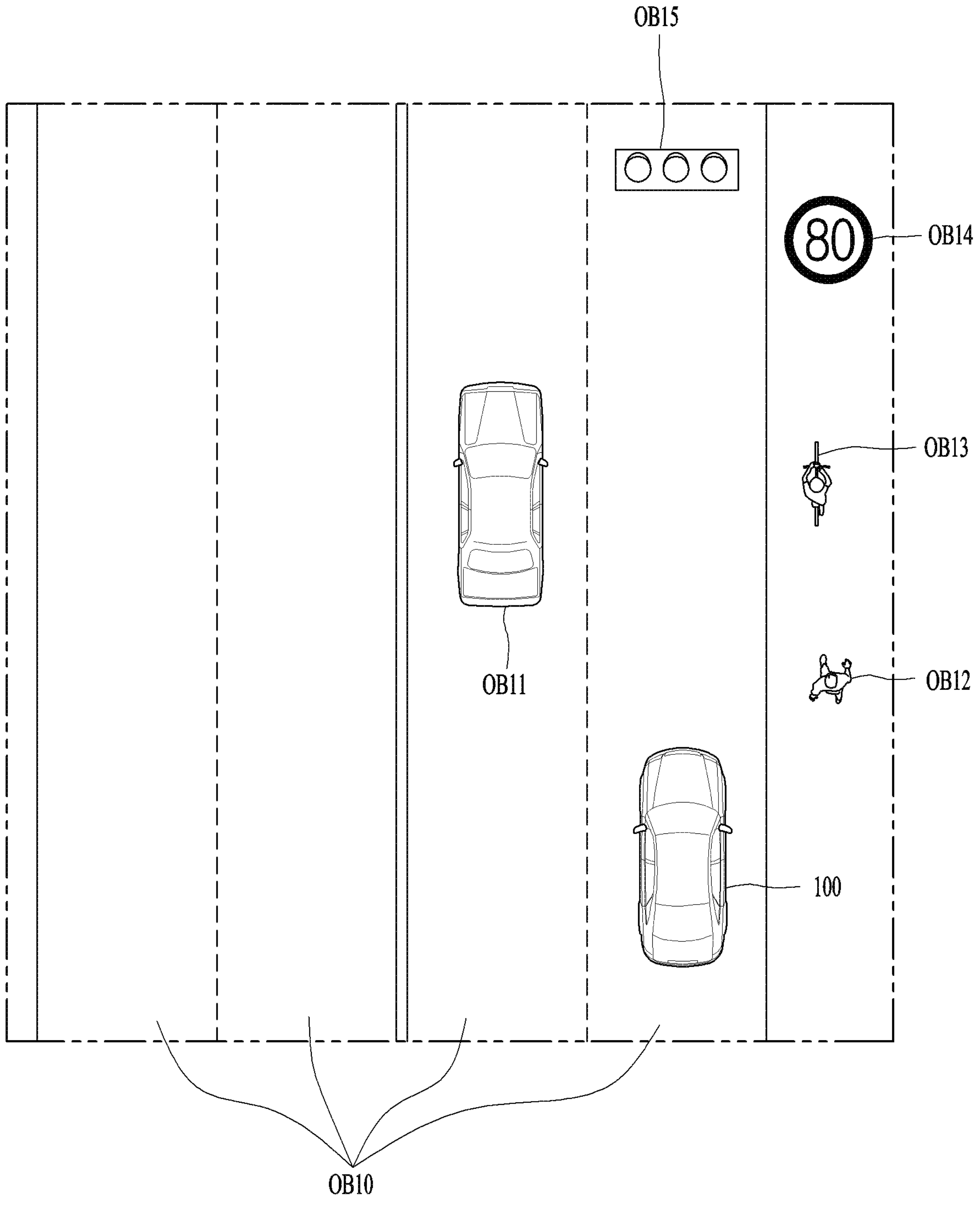
FIGS. 5 and 6 are views that are referenced to describe various objects associated with the traveling of the vehicle in accordance with the embodiment of the present disclosure.
Figure 6:
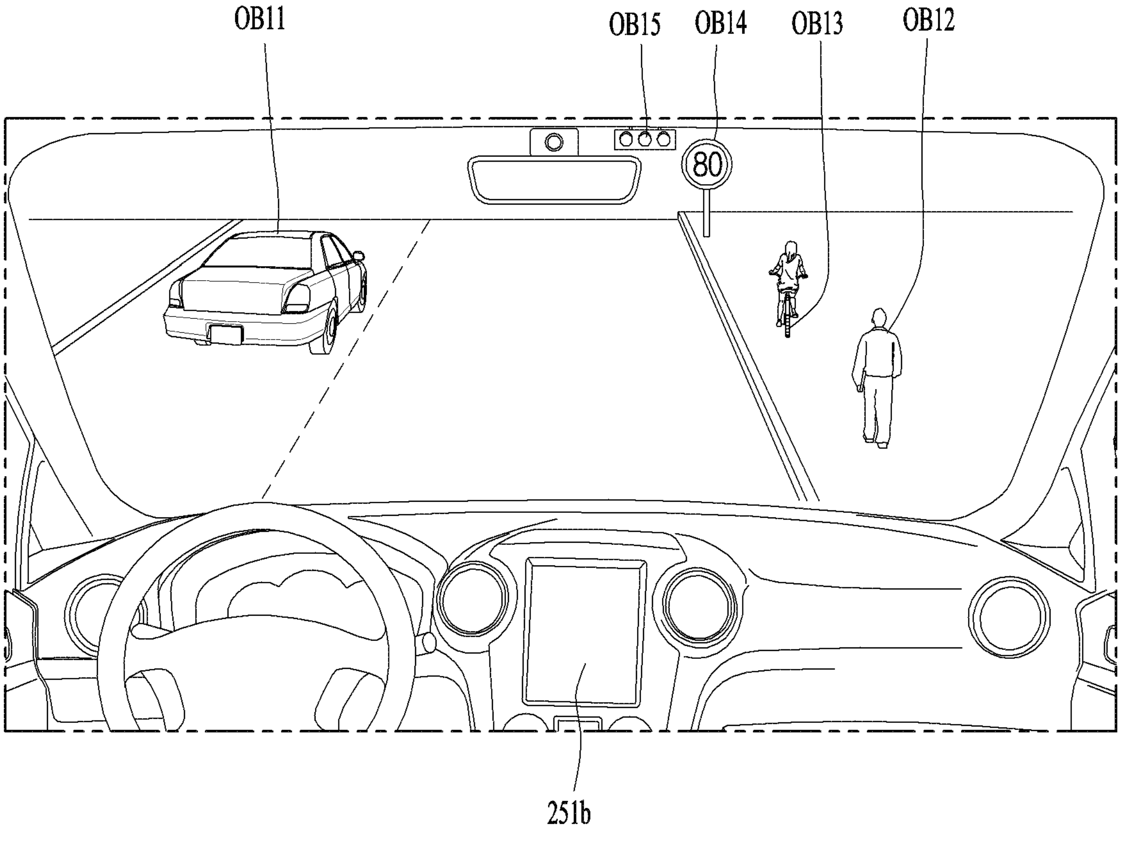

FIGS. 5 and 6 are views each illustrating various objects associated with the traveling of the vehicle in accordance with the embodiment of the present disclosure.

Figure 7:
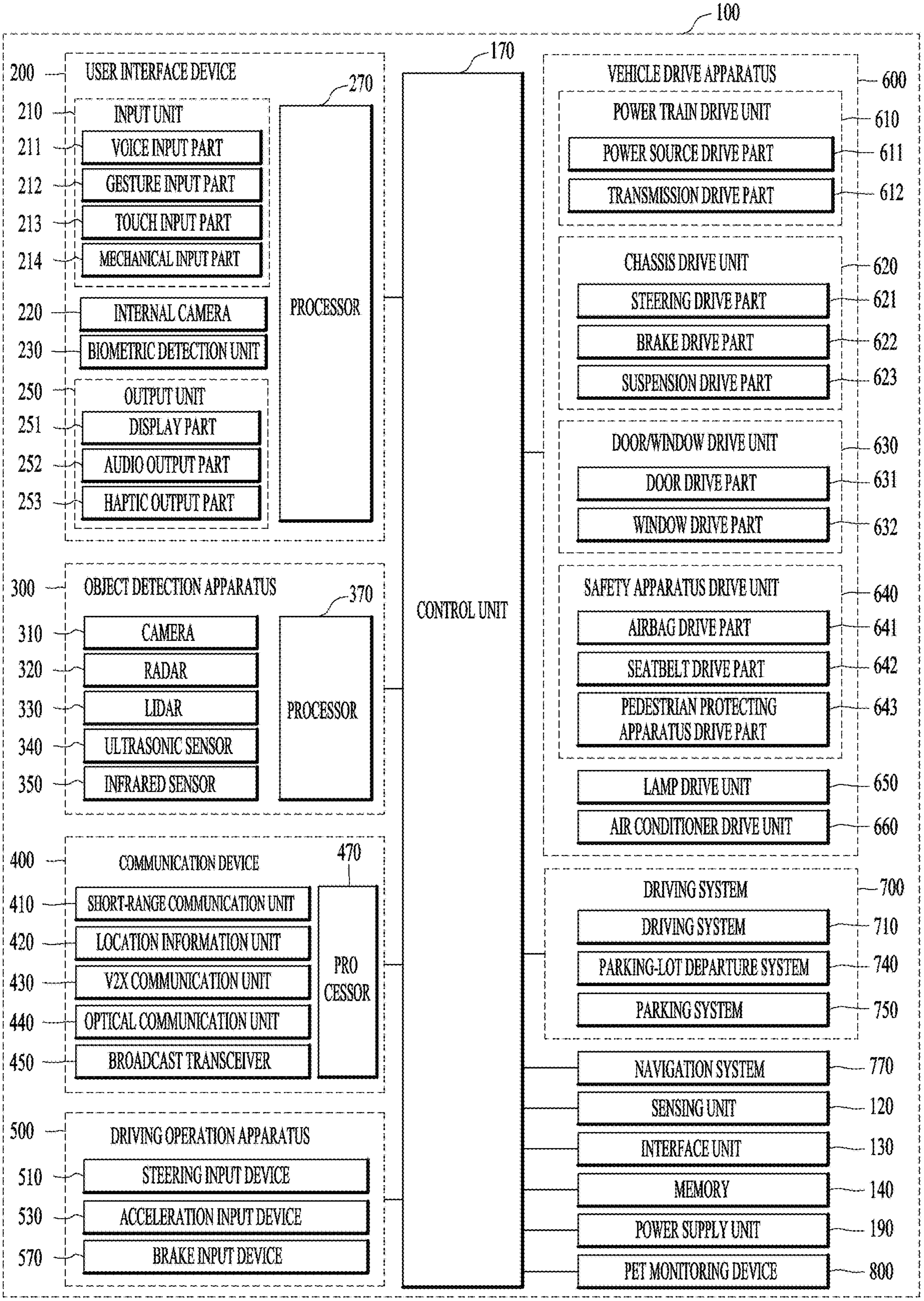
FIG. 7 is a block diagram that is referenced to describe the vehicle in accordance with the embodiment of the present disclosure.

FIG. 7 is a block diagram that is referenced to describe the vehicle in accordance with the embodiment of the present disclosure. FIG. 7 is a block diagram that is referenced to describe the vehicle according to the embodiment of the present disclosure.

With reference to FIGS. 1 to 7, a vehicle 100 may include wheels that rotate by a power source and a steering input apparatus 510 for adjusting the driving direction of the vehicle 100.

The vehicle 100 may be an autonomous traveling vehicle. The vehicle 100 may switch to an autonomous traveling mode or a manual mode on the basis of a user input. For example, the vehicle 100 may switch from the manual mode to the autonomous traveling mode or from the autonomous traveling mode to the manual mode on the basis of a user input through a user interface device 200 (hereinafter referred to as a 'user terminal').

The vehicle 100 may switch to the autonomous traveling mode or the manual mode on the basis of the traveling situation information. A traveling situation information may be generated on the basis of object information provided by the object detection apparatus 300. For example, the vehicle 100 may switch from the manual mode to the autonomous traveling mode or from the autonomous traveling mode to the manual mode on the basis of the traveling situation information generated by the object detection apparatus 300. For example, the vehicle 100 may switch from the manual mode to the autonomous traveling mode or from the autonomous traveling mode to the manual mode on the basis of the traveling situation information through a communication device 400.

The vehicle 100 may switch from the manual mode into the autonomous traveling mode or from the autonomous traveling mode to the manual mode on the basis of information, data, signals, all of which are provided by an external device.

In a case where the vehicle 100 may be driven in the autonomous traveling mode, the vehicle 100 may be driven through the use of a driving system 700. For example, the vehicle 100 may be driven on the basis of information, data, and signals, all of which are generated by a traveling system 710, a parking-lot departure system 740, and a parking system 750.

When the vehicle 100 is driven in the manual mode, the vehicle 100 may receive the user input for driving through a driving operation apparatus 500. The vehicle 100 may be driven on the basis of the user input received through the driving operation apparatus 500.

The overall length refers to the length from the front end to the rear end of the vehicle 100, the width refers to the width of the vehicle 100, and the height refers to the length from the bottom of the wheel to the roof. In the following description, an overall-length direction L may refer to a direction which serves as a reference for measuring the overall length of the vehicle 100, a width direction W may refer to a direction that serves as a reference for measuring the width of the vehicle 100, and a height direction H may refer to a direction that serves as a reference for measuring the height of the vehicle 100.

As illustrated in FIG. 7, the vehicle 100 may include the user interface device (hereinafter referred to as the 'user terminal') 200, the object detection apparatus 300, the communication device 400, the driving operation apparatus 500, a vehicle drive apparatus 600, a driving system 700, a navigation system 770, a sensing unit 120, a vehicular interface unit 130, a memory 140, a control unit 170 and a power supply unit 190.

According to an embodiment, the vehicle 100 may further include one or more constituent elements in addition to constituent elements described in the present specification or may omit one or more of the described constituent elements.

The user interface device 200 is a device for communication between the vehicle 100 and the user. The user interface device 200 may receive the user input and may provide generated by the vehicle 100 to the user. The vehicle 100 may implement a user interface (UI) or user experience (UX) through the user interface device (hereinafter referred to as the 'user terminal') 200.

The user interface device 200 may include an input unit 210, an internal camera 220, a biometric detection unit 230, an output unit 250, and a processor 270. According to an embodiment, the user interface device 200 may further include one or more constituent elements in addition to constituent elements described in the present specification or may omit one or more of the described constituent elements.

The input unit 210 serves to receive information, as input, from the user. Data collected in the input unit 210 may be analyzed by the processor 270 and processed into a user's control command.

The input unit 210 may be arranged inside the vehicle 100. For example, the input unit 210 may be arranged on one region of the steering wheel, one region of the instrument panel, one region of the seat, one region of each pillar, one region of the door, one region of the center console, one region of the headlining, one region of the sun visor, one region of the windshield, one region of the window, or one region of a similar location.

The input unit 210 may include a voice input part 211, a gesture input part 212, a touch input part 213, and a mechanical input part 214.

The voice input part 211 may convert a user's voice input into an electric signal. The electric signal, resulting from the conversion, may be provided to the processor 270 or the control unit 170. The voice input part 211 may include at least one microphone.

The gesture input part 212 may convert a user's gesture input into an electric signal. The electric signal, resulting from the conversion, may be provided to the processor 270 or the control unit 170.

The gesture input part 212 may include at least one of the following: an infrared sensor or an image sensor, each of which is for detecting the user's gesture input. According to an embodiment, the gesture input part 212 may detect a user's three-dimensional (3D) gesture input. To this end, the gesture input part 212 may include a light-emitting diode, which emits a plurality of infrared rays. or a plurality of image sensors.

The gesture input part 212 may detect the user's 3D gesture input through a time of flight (TOF) method, a structured light method, or a disparity method.

The touch input part 213 may convert the user's touch input into an electric signal. The electric signal, resulting from the conversion, may be provided to the processor 270 or the control unit 170.

The touch input part 213 may include a touch sensor for detecting the user's touch input. According to an embodiment, the touch input part 213 may be integrally formed with a display part 251, thereby implementing a touch screen. This touch screen may provide both an input interface and an output interface between the vehicle 100 and the user.

The mechanical input part 214 may include at least one of the following: a button, a dome switch, a jog wheel, or a jog switch. An electric signal generated by the mechanical input part 214 may be provided to the processor 270 or the control unit 170. The mechanical input part 214 may be arranged on a steering wheel, a center fascia, a center console, a cockpit module, a door, and the like.

The internal camera 220 may acquire an image of the interior of the vehicle 100. The processor 270 may detect a user's state on the basis of the image of the interior of the vehicle 100. The processor 270 may acquire the user's gaze information from the image of the interior of the vehicle 100. The processor 270 may detect the user's gesture from the image of the interior of the vehicle 100.

The biometric detection unit 230 may acquire the user's biometric information. The biometric detection unit 230 may include a sensor for acquiring the user's biometric information and may acquire the user's fingerprint information, heart rate information, and the like using the sensor. The biometric information may be used for user authentication.

The output unit 250 may generate an output associated with sight, hearing, or touch. The output unit 250 may include at least one of the following: the display part 251, an audio output part 252, or a haptic output part 253.

The display part 251 may output graphic objects corresponding to various types of information. The display part 251 may include at least one of the following: a liquid crystal display (LCD), a thin film transistor-LCD (TFT LCD), an organic light-emitting diode (OLED), a flexible display, a three-dimensional (3D) display, or an e-ink display.

The display part 251 may be inter-layered with, or integrally formed with, the touch input part 213, thereby implementing a touch screen.

The display part 251 may be implemented as a head-up display (HUD). In a case where the display part 251 may be implemented as the HUD, the display part 251 may be equipped with a projection module and thus may output information through an image that is projected onto a window shield or a window.

An example of the display part 251 may be a transparent display. The transparent display may be attached to the windshield or the window. The transparent display may have a predetermined degree of transparency and may output a predetermined screen thereon. The transparent display may include at least one of the following: a thin film electroluminescent (TFEL), a transparent organic light-emitting diode (OLED), a transparent a liquid crystal display (LCD), a transmissive transparent display, or a transparent light-emitting diode (LED) display. The transparent display may have adjustable transparency.

The user interface device 200 may include a plurality of display parts, for example, display parts 251*a* to 251*g*.

The display part 251 may be arranged on one region of the steering wheel, one region 521*a*, 251*b*, or 251*e* of the instrument panel, one region 251*d* of the seat, one region 251*f* of each pillar, one region 251*g* of the door, one region of the center console, one region of the headlining, or one region of the sun visor, or may be implemented on one region 251*c* of the windshield, or one region of the window.

The audio output part 252 converts an electric signal provided from the processor 270 or the control unit 170 into an audio signal and outputs the audio signal. To this end, the audio output part 252 may include at least one speaker.

The haptic output part 253 generates a tactile output. For example, the haptic output part 253 may operate to vibrate the steering wheel, the safety belt, and the seats 110FL, 110FR, 110RL, and 110RR, thereby enabling the user to recognize the vibration output.

The processor (hereinafter referred to as the 'control unit') 270 may control the overall operation of each unit of the user interface device 200. According to an embodiment, the user interface device 200 may include a plurality of processors 270 or may not include any processor 270.

In a case where the processor 270 is not included in the user interface device 200, the user interface device 200 may operate under the control of a processor of another apparatus within the vehicle 100 or under the control of the control unit 170.

The user interface device 200 may be referred to as a vehicular display apparatus. The user interface device 200 may operate under the control of the control unit 170.

The object detection apparatus 300 is an apparatus for detecting an object located outside the vehicle 100. Examples of the object may include a variety of things associated with the driving of the vehicle 100. With reference to FIGS. 5 and 6, examples of an object O may include a traffic lane OB10, a different vehicle OB11, a pedestrian OB12, a two-wheeled vehicle OB13, traffic signals OB14 and OB15, ambient light, a road, a structure, a speed bump, a terrain feature, an animal, and the like.

The lane OB10 may be a traveling lane, a lane adjacent to the traveling lane, or a lane along which another vehicle in the opposite direction travels. The lane OB10 may conceptually include the left and right boundary lines forming a lane.

The different vehicle OB11 may be a vehicle which travels in the vicinity of the vehicle 100. The different vehicle OB11 may be a vehicle located within a predetermined distance from the vehicle 100. For example, the different vehicle OB11 may be a vehicle which travels ahead of or behind the vehicle 100.

The pedestrian OB12 may be a person located in the vicinity of the vehicle 100. The pedestrian OB12 may be a person located within a predetermined distance from the vehicle 100. For example, the pedestrian OB12 may be a person located on a sidewalk or roadway.

The two-wheeled vehicle OB12 may be a person-carrying vehicle that is located in the vicinity of the vehicle 100 and moves on two wheels. The two-wheeled vehicle OB12 may be a person-carrying vehicle that is located within a predetermined distance from the vehicle 100 and has two wheels. For example, the two-wheeled vehicle OB13 may be a motorcycle or a bicycle that is located on a sidewalk or roadway.

Examples of the traffic signal may include a traffic light OB15, a traffic sign OB14, and a pattern or text drawn on a road surface.

The ambient light may be light generated from a lamp provided on another vehicle. The ambient light may be light generated from a streetlamp. The ambient light may be solar light.

Examples of the road may include a road surface, a curve, an upward slope, a downward slope, and the like.

The structure may be an object that is located in the vicinity of a road and fixed on the ground. Examples of the structure may include a streetlamp, a roadside tree, a building, an electric pole, a traffic light, a bridge, and the like.

Examples of the terrain feature may include a mountain, a hill, and the like.

Objects may be classified into moving objects and stationary objects. Examples of the moving object may conceptually include another vehicle and a pedestrian. Examples of the stationary object may include a traffic signal, a road, and a structure.

The object detection apparatus 300 may include a camera 310, a radar 320, a LIDAR 330, an ultrasonic sensor 340, an infrared sensor 350, and a processor 370.

According to an embodiment, the object detection apparatus 300 may further include one or more constituent elements in addition to constituent elements described in the present specification or may omit one or more of the described constituent elements.

The camera 310 may be located in an appropriate portion of the exterior of the vehicle 100 to acquire an image of the surroundings of the vehicle. The camera 310 may be a mono camera, a stereo camera 310*a*, an Around View Monitoring (AVM) camera 310*b*, or a 360-degree camera.

For example, the camera 310 may be arranged adjacent to a front windshield within the vehicle 100 to acquire an image of the surroundings in front of the vehicle 100. Alternatively, the camera 310 may be arranged in the vicinity of the front bumper or the radiator grill.

For example, the camera 310 may be arranged adjacent to a rear glass pane within the vehicle 100 to acquire an image of the surroundings behind the vehicle 100. Alternatively, the camera 310 may be arranged adjacent to the rear bumper, the trunk, or the tail gate.

For example, the camera 310 may be arranged adjacent to at least one of the side windows within the vehicle 100 to acquire an image of the surroundings alongside the vehicle 100. Alternatively, the camera 310 may be arranged in the vicinity of the side mirror, the fender, or the door.

The camera 310 may provide an acquired image to the processor 370.

The radar 320 may include an electromagnetic wave transmission unit and an electromagnetic wave reception unit. The radar 320 may be implemented in compliance with a pulse radar scheme or a continuous wave radar scheme according to the principle of emitting a radio wave. The radar 320 may be implemented in compliance with a Frequency Modulated Continuous Wave (FMCW) scheme or a Frequency Shift Keying (FSK) scheme, each of which is among continuous wave radar schemes, according to a signal waveform.

The radar 320 may detect an object using a time of flight (TOF) technique or a phase-shift technique, with an electromagnetic wave as a medium, and may detect a location of the detected object, a distance to the detected object, and a relative speed with respect to the detected object.

The radar 320 may be arranged in an appropriate position on the exterior of the vehicle 100 to detect an object that is located in front of, behind, or alongside the vehicle 100.

The LiDAR 330 may include a laser transmission unit and a laser reception unit. The LiDAR 330 may be implemented using a time of flight (TOF) technique or a phase-shift technique.

The LiDAR 330 may be implemented as a drive type or non-drive type LiDAR.

In a case where the LiDAR 330 may be implemented as a drive type LiDAR, the LiDAR 330 may be rotated by a motor and may detect an object in the vicinity of the vehicle 100.

In a case where the LiDAR 330 may be implemented as a non-drive type LiDAR, the LiDAR 330 may detect, through light steering, an object located within a predetermined range of the vehicle 100. The vehicle 100 may include a plurality of non-drive type LiDARs 330.

The LiDAR 330 may detect an object using a time of flight (TOF) technique or a phase-shift technique, with laser light as a medium, and may detect a location of the detected object, a distance to the detected object and a relative speed with respect to the detected object.

The radar 330 may be arranged in an appropriate position on the exterior of the vehicle 100 to detect an object that is located in front of, behind, or alongside the vehicle 100.

The ultrasonic sensor 340 may include an ultrasonic wave transmission unit and an ultrasonic wave reception unit. The ultrasonic sensor 340 may detect an object using an ultrasonic wave and may detect a position of the detected object, a distance to the detected object and a relative speed with respect to the detected object.

The ultrasonic sensor 340 may be arranged in an appropriate position on the exterior of the vehicle 100 to detect an object located in front of, behind, or alongside the vehicle 100.

The infrared sensor 350 may include an infrared ray transmission unit and an infrared ray reception unit. The infrared sensor 340 may detect an object on the basis of infrared light, and may detect a location of the detected object, a distance from the detected object and a relative speed with the detected object.

The infrared sensor 350 may be arranged in an appropriate position on the exterior of the vehicle 100 to detect an object located in front of, behind, or alongside the vehicle 100.

The processor 370 may control the overall operation of each unit of the object detection apparatus 300.

The processor 370 may detect an object on the basis of an acquired image and may track the object. The processor 370 may perform operations, such as calculation of a distance to an object and calculation of a relative speed with respect to the object, through an image processing algorithm.

The processor 370 may detect an object on the basis of a reflected electromagnetic wave, resulting from an emitted electromagnetic wave being reflected off the object, and may track the object. The processor 370 may perform operations, such as calculation of a distance to the object and calculation of a relative speed with respect to the object, on the basis of the electromagnetic wave.

The processor 370 may detect an object on the basis of a reflected laser beam, resulting from an emitted laser being reflected off the object, and may track the object. The processor 370 may perform operations, such as calculation of a distance to the object and calculation of a relative speed with respect to the object, on the basis of the laser beam.

The processor 370 may detect an object on the basis of a reflected ultrasonic wave, resulting from an emitted ultrasonic wave being reflected off the object, and may track the object. The processor 370 may perform operations, such as calculation of a distance to the object and calculation of a relative speed with respect to the object, on the basis of the ultrasonic wave.

The processor 370 may detect an object on the basis of reflected infrared light, resulting from emitted infrared light being reflected off the object, and may track the object. The processor 370 may perform operations, such as calculation of a distance to the object and calculation of a relative speed with respect to the object, on the basis of the infrared light.

According to an embodiment, the object detection apparatus 300 may include a plurality of processors 370 or may not include any processor 370. For example, each of the following: the camera 310, the radar 320, the LiDAR 330, the ultrasonic sensor 340, and the infrared sensor 350 may include its own processor individually.

In a case where the processor 370 is not included in the object detection apparatus 300, the object detection apparatus 300 may operate under the control of a processor of an apparatus within the vehicle 100 or under the control of the control unit 170.

The object detection device 400 may operate under the control of the control unit 170.

The communication device 400 is a device for performing communication with an external device. The external device here may be another vehicle, a mobile terminal, or a server.

To perform communication, the communication device 400 may include a transmission antenna, a reception antenna, and at least one of the following: a radio frequency (RF) circuit or an RF device, each of which is capable of implementing various communication protocols.

The communication device 400 may include a short-range communication unit 410, a location information unit 420, a V2X communication unit 430, an optical communication unit 440, a broadcast transceiver 450, and a processor 470.

According to an embodiment, the communication device 400 may further include one or more constituent elements in addition to constituent elements in the present specification or may omit one or more of the described constituent elements.

The short-range communication unit 410 is a unit for short-range communication. The short-range communication unit 410 may support short-range communication using at least one of the following technologies: Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, or Wireless Universal Serial Bus (USB).

The short-range communication unit 410 may form short-range wireless area networks and may perform short-range communication between the vehicle 100 and at least one external device.

The location information unit 420 is a unit for acquiring location information of the vehicle 100. For example, the location information unit 420 may include a Global Positioning System (GPS) module or a Differential Global Positioning System (DGPS) module.

The V2X communication unit 430 is a unit for performing wireless communications with a server (Vehicle to Infrastructure, V2I), another vehicle (Vehicle to Vehicle, V2V), or a pedestrian (Vehicle to Pedestrian, V2P). The V2X communication unit 430 may include an RF circuit capable of implementing protocols for communication with an infrastructure (V2I), communication between vehicles (V2V), and communication with a pedestrian (V2P).

The optical communication unit 440 is a unit for performing communication with an external device, with light as a medium. The optical communication unit 440 may include an optical transmission part for converting an electric signal into an optical signal and transmitting the optical signal to the outside, and an optical reception part for converting the received optical signal back into an electric signal.

According to an embodiment, the optical transmission part may be formed integrally with a lamp provided on the vehicle 100.

The broadcast transceiver 450 is a unit for receiving a broadcast signal from an external broadcast management server or transmitting a broadcast signal to the broadcast managing server over a broadcast channel. The broadcast channel may include a satellite channel, a terrestrial channel, or both. The broadcast signal may include a TV broadcast signal, a radio broadcast signal, and a data broadcast signal.

The processor 470 may control the overall operation of each unit of the communication device 400.

According to an embodiment, the communication device 400 may include a plurality of processors 470 or may not include any processor 470.

In a case where the processor 470 is not included in the communication device 400, the communication device 400 may operate under the control of a processor of another device within the vehicle 100 or under the control of the control unit 170.

The communication device 400, along with the user interface device 200, may implement a vehicular display device. In this case, the vehicular display device may be referred to as a telematics device or an Audio Video Navigation (AVN) device.

The communication device 400 may operate under the control of the control unit 170.

The driving operation apparatus 500 is an apparatus for receiving a user input for driving.

In the manual mode, the vehicle 100 may be driven on the basis of a signal provided by the driving operation apparatus 500.

The driving operation apparatus 500 may include the steering input device 510, an acceleration input device 530 and a brake input device 570.

The steering input apparatus 510 may receive an input regarding the driving direction of the vehicle 100 from the user. The steering input apparatus 510 is preferably configured in the form of a wheel, allowing a steering input by the wheel's rotation. According to an embodiment, the steering input apparatus may also be configured in the shape of a touch screen, a touch pad, or a button.

The acceleration input apparatus 530 may receive an input for accelerating the vehicle 100 from the user. The brake input apparatus 570 may receive an input for decelerating the vehicle 100 from the user. The acceleration input apparatus 530 and the brake input apparatus 570 are preferably configured in the shape of a pedal. According to an embodiment, the acceleration input apparatus or the brake input apparatus may also be configured in the shape of a touch screen, a touch pad or a button.

The driving operation apparatus 500 may operate under the control of the control unit 170.

The vehicle drive apparatus 600 is an apparatus that electrically controls driving of the various apparatuses within the vehicle 100.

The vehicle drive apparatus 600 may include a power train drive unit 610, a chassis drive unit 620, a door/window drive unit 630, a safety apparatus drive unit 640, a lamp drive unit 650, and an air-conditioner drive unit 660.

According to an embodiment, the vehicle drive apparatus 600 may further include one or more constituent elements in addition to constituent elements in the present specification or may omit one or more of the described constituent elements.

The vehicle drive apparatus 600 may include a processor. Each unit of the vehicle drive apparatus 600 may individually include its own processor.

The power train drive unit 610 may control the operation of a power train apparatus.

The power train drive unit 610 may include a power source drive part 611 and a transmission drive part 612.

The power source drive part 611 may execute control on the power source of the vehicle 100.

For example, in a case where the power source of the vehicle 100 is a fossil fuel-based engine, the power source drive part 611 may execute electronic control on the engine. Accordingly, the output torque and other parameters of the engine may be controlled. The power source drive part 611 may adjust the engine output torque under the control of the control unit 170.

For example, in a case where the power source of the vehicle 100 is an electric energy-based motor, the power source drive part 611 may execute control on the motor. The power source drive part 611 may adjust a rotational speed, torque, and other parameters of the motor under the control of the control unit 170.

The transmission drive part 612 may execute control on a transmission. The transmission drive gearbox part 612 may adjust the state of the transmission. The transmission drive part 612 may change the state of the transmission to Drive (D), Reverse (R), Neutral (N), or Park (P).

In a case where the power source of the vehicle 100 is an engine, the transmission drive part 612 may adjust the engaged state of a gear in Drive (D).

The chassis drive unit 620 may control the operation of a chassis apparatus. The chassis drive unit 620 may include a steering drive part 621, a brake drive part 622, and a suspension drive part 623.

The steering drive part 621 may execute electronic control on a steering apparatus within the vehicle 100. The steering drive part 621 may change the driving direction of the vehicle 100.

The brake drive part 622 may execute electronic control on a brake apparatus within the vehicle 100. For example, the brake drive part 622 may reduce the speed of the vehicle 100 by controlling the operation of the brakes provided on the wheels.

The brake drive part 622 may individually control each of the brakes. The brake drive part 622 may control braking forces applied to the wheels so that they differ from one another.

The suspension drive part 623 may execute electronic control on a suspension apparatus within the vehicle 100. For example, in a case where a road surface is uneven, the suspension drive part 623 may reduce vibration of the vehicle 100 by controlling the suspension apparatus. The suspension drive part 623 may individually control each of the plurality of suspensions.

The door/window drive unit 630 may execute electronic control on a door apparatus or a window apparatus within the vehicle 100.

The door/window drive unit 630 may include a door drive part 631 and a window drive part 632.

The door drive part 631 may execute control on the door apparatus. The door drive part 631 may control the opening or closing of the plurality of doors included in the vehicle 100. The door drive part 631 may control the opening or closing of the trunk or the tailgate. The door drive part 631 may control the opening or closing of the sunroof.

The window drive part 632 may execute electronic control on the window apparatus. The window drive part 632 may control the opening or closing of the plurality of windows included in the vehicle 100.

The safety apparatus drive unit 640 may execute electronic control on the various safety apparatuses within the vehicle 100.

The safety apparatus drive unit 640 may include an airbag drive part 641, a seatbelt drive part 642, and a pedestrian protection apparatus drive part 643.

The airbag drive part 641 may execute electronic control on the airbag apparatus within the vehicle 100. For example, when a risk is detected, the airbag drive part 641 may control the airbag to deploy.

The seatbelt drive part 642 may execute electronic control on the seatbelt apparatus within the vehicle 100. For example, when a risk is detected, the seatbelt drive part 642 may secure the occupants in seats 110FL, 110FR, 110RL, and 110RR by tightening seatbelts.

The pedestrian protection apparatus drive part 643 may execute electronic control on the hood lift and the pedestrian airbag. For example, when a collision with a pedestrian is detected, the pedestrian protection apparatus drive part 643 may control the hood lift and the pedestrian airbag to deploy.

The lamp drive part 650 may execute electronic control on the various lamp apparatuses within the vehicle 100.

The air-conditioner drive unit 660 may execute electronic control on the air conditioner within the vehicle 100. For example, when the temperature inside the vehicle 100 is high, the air-conditioner drive unit 660 may control the air conditioner to operate in such a manner as to supply cool air into the vehicle 100.

The vehicle drive apparatus 600 may include a processor. Each unit of the vehicle drive apparatus 600 may individually include its own processor.

The vehicle drive apparatus 600 may operate under the control of the control unit 170.

The driving system 700 is a system that controls various driving functions of the vehicle 100. The driving system 700 may operate in the autonomous traveling mode.

The driving system 700 may include the traveling system 710, the parking-lot departure system 740, and the parking system 750.

According to an embodiment, the driving system 700 may further include one or more constituent elements in addition to constituent elements described in the present disclosure or may emit one or more of the described constituent elements.

The driving system 700 may include a processor. Each unit of the driving system 700 may individually include its own processor.

According to an embodiment, in a case where the driving system 700 may be implemented in software, the driving system 700 may also conceptually operate at a lower level than the control unit 170.

According to an embodiment, the driving system 700 may conceptually include at least one of the following: the user interface device 200, the object detection apparatus 300, the communication device 400, the vehicle drive apparatus 600, or the control unit 170.

The traveling system 710 may enable the vehicle 100 to travel.

The traveling system 710 may receive navigation information from a navigation system 770, may provide a control signal to the vehicle drive apparatus 600, and may enable the vehicle 100 to travel. The traveling system 710 may receive object information from the object detection apparatus 300, may provide a control signal to the vehicle drive apparatus 600 and may enable the vehicle 100 to travel. The traveling system 710 may receive a signal from an external device through the communication device 400, may provide a control signal to the vehicle drive apparatus 600, and may enable the vehicle 100 to travel.

The parking-lot departure system 740 may perform a departure maneuver for the vehicle 100.

The parking-lot departure system 740 may receive navigation information from the navigation system 770, may provide a control signal to the vehicle drive apparatus 600, and may perform a departure maneuver for the vehicle 100. The parking-lot departure system 740 may receive object information from the object detection apparatus 300, may provide a control signal to the vehicle drive apparatus 600, and may perform a departure maneuver for the vehicle 100. The parking-lot departure system 740 may receive a signal from an external device through the communication device 400, may provide a control signal to the vehicle drive apparatus 600, and may perform a departure maneuver for the vehicle 100.

The parking system 750 may perform a parking maneuver for the vehicle 100.

The parking system 750 may receive navigation information from the navigation system 770, may provide a control signal to the vehicle drive apparatus 600, and may perform a parking maneuver for the vehicle 100. The parking system 750 may receive object information from the object detection apparatus 300, may provide a control signal to the vehicle drive apparatus 600 and may perform a parking maneuver for the vehicle 100. The parking system 750 may receive a signal from an external device through the communication device 400, may provide a control signal to the vehicle drive apparatus 600, and may perform a parking maneuver for the vehicle 100.

The navigation system 770 may provide navigation information. The navigation information may include at least one of the following: map information, set-destination information, path information based on the set destination, information about various objects on a path, lane information, or current vehicular location information.

The navigation system 770 may include a memory and a processor. The navigation information may be stored in the memory. The processor may control the operation of the navigation system 770.

According to an embodiment, the navigation system 770 may update pre-stored information by receiving information from an external device through the communication device 400.

According to an embodiment, the navigation system 770 may also be classified as a sub-constituent element of the user interface device 200.

The sensing unit 120 may sense the state of the vehicle 100. The sensing unit 120 may include a posture sensor (for example, a yaw sensor, a roll sensor, a pitch sensor, or the like), a collision sensor, a wheel sensor, a speed sensor, a tilt sensor, a weight-detection sensor, a heading sensor, a gyro sensor, a position module, a vehicle forward/backward movement sensor, a battery sensor, a fuel sensor, a tire sensor, a steering sensor sensing the turning of a steering wheel, an in-vehicle temperature sensor, an in-vehicle humidity sensor, an ultrasonic sensor, an illumination sensor, an accelerator position sensor, a brake pedal position sensor, and other sensors.

The sensing unit 120 may acquire vehicular posture information, vehicular collision information, vehicular direction information, vehicular location information (GPS information), vehicular angle information, vehicular speed information, vehicular acceleration information, vehicular tilt information, vehicular forward/backward movement information, battery information, fuel information, tire information, vehicular lamp information, in-vehicle temperature information, and in-vehicle humidity information. Furthermore, the sensing unit 120 may acquire signals that result from sensing a steering wheel rotation angle, outside-vehicle illumination, pressure applied to an acceleration pedal, pressure applied to a brake pedal, and the like.

The sensing unit 120 may further include an acceleration pedal sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and other sensors.

The vehicular interface unit 130 may serve as a path to various types of external devices connected to the vehicle 100. For example, the vehicular interface unit 130 may include a port that enables a connection with a mobile terminal and may be connected to the mobile terminal through the port. In this case, the vehicular interface unit 130 may exchange data with the mobile terminal.

The vehicular interface unit 130 may serve as a path for supplying electric energy to the connected mobile terminal. In a case where the mobile terminal is electrically connected to the vehicular interface unit 130, the vehicular interface unit 130 may supply electric energy, supplied from the power supply unit 190, to the mobile terminal under the control of the control unit 170.

The memory 140 is electrically connected to the control unit 170. Basic data for the units, control data for controlling operations of the units, and data, which are input and output, may be stored in the memory 140. Examples of the memory 140 may include various hardware storage devices, such as a ROM, a RAM, an EPROM, a flash drive, and a hard drive. Programs for processing or control by the control unit 170, and various data for the overall operation of the vehicle 100 may be stored in the memory 140.

According to an embodiment, the memory 140 may be configured to be integrated with the control unit 170 or may be implemented as a sub-constituent element of the control unit 170.

The control unit 170 may control the overall operation of each unit within the vehicle 100. The control unit 170 may be referred to as an Electronic Control Unit (ECU).

The power supply unit 190 may supply power necessary for the operation of each constituent element under the control of the control unit 170. Specifically, the power supply unit 190 may receive power supplied from the battery inside the vehicle 100, or from other sources.

At least one processor and the control unit 170, which are included in the vehicle 100, may be implemented using at least one of the following: application-specific integrated circuits (ASICs), digital signal processors (DSPs), digital signal processing devices (DSPDs), programmable logic devices (PLDs), field programmable gate arrays (FPGAs), processors, controllers, micro controllers, microprocessors, or electric units performing other functions.

A pet monitoring device 800 is located within a vehicle. In the state where the vehicle is parked or stopped or while the vehicle travels, the pet monitoring device 800 may operate in such a manner that the vehicle executes the pet mode. Specifically, in a case where a pet is present within the vehicle, the pet monitoring device 800 may recognize the presence of the pet within the vehicle and may monitor the pet's state. Furthermore, the pet monitoring device 800 may perform a situation-based intervention operation and an alerting operation for pet care on the basis of the result of the monitoring.

In a state where the vehicle travels or in the state where the vehicle is parked or stopped, the pet monitoring device 800 may operate in the pet mode in response to receiving a signal corresponding to a preset input.

In a state where the pet mode is not set and where a guardian is not present, the pet monitoring device 800 may transmit a request to set the pet mode to a registered user terminal in a case where the pet's movement is detected within the vehicle.

In the state where the vehicle is parked or stopped, while the pet mode is executed, the pet monitoring device 800 may determine the pet's anxious state on the basis of the result of monitoring an amount of change in the pet's movement, and may perform various operations for relieving the anxious state. At this point, the various operations for relieving the anxious state may include operations, such as activating an ANC function, automatically adjusting an HVAC system, providing a pet-related content screen, outputting the guardian's voice, and establishing a video call connection with the user terminal. In addition, two or more of the various operations for keeping the pet relaxed may be performed simultaneously or sequentially. Then, learning is performed on the basis of the pet's response to the performed operations, thereby performing operations of providing tailored pet care.

In addition, an HVAC system 780 may perform a cooling operation and a warming operation within the vehicle through a control module. In addition, the HVAC system 780 may be controlled to independently perform the cooling or warming operation to a desired level based on the position of each of the seats including the driver's seat, the front seats, and the rear seats. The HVAC system 780 may operate to adjust a set cooling or warming level on the basis of the temperature outside the vehicle and the temperature inside the vehicle.

In addition, an ANC system 790 is an apparatus/system that performs an active noise cancellation function of the vehicle. The ANC system 790, in its activated state, detects the movement of the vehicle's engine or detects noise due to the operation of a heater and generates antiphase sound to counter the noise caused by the operation of the engine/heater. Consequently, through noise cancellation, the ANC system 790 operates to reduce the noise caused by the operation of the engine/heater within the vehicle. To this end, the ANC system 790 may include an external amplifier equipped with one or more ANC algorithms, a plurality of speakers, and a control module that controls these components.

Figure 8:
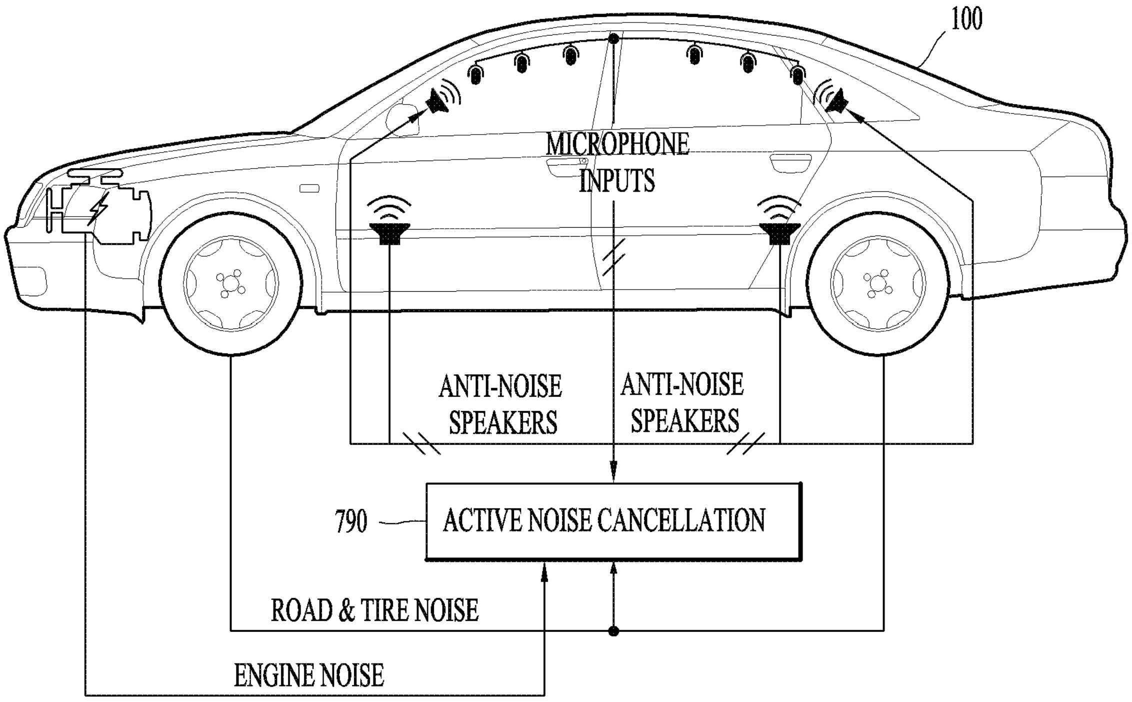
FIG. 8 is a view that is referenced to describe the active noise cancellation (ANC) function of the vehicle in accordance with the embodiment of the present disclosure.

FIG. 8 is an illustrative view that is referenced to describe in more detail the active noise cancellation (ANC) function of the vehicle in accordance with the embodiment of the present disclosure.

Normally, ANC technology that applies to vehicles refers to a technology that detects an engine's movement and generates antiphase sound to counter noise from the engine, thereby reducing the vehicle's engine noise heard inside the vehicle through phase cancellation. Therefore, an ANC function of the vehicle is shortened for an active noise cancellation function of a vehicle.

According to the present disclosure, the ANC function that applies in the state where the vehicle is parked or stopped is described. The state where the vehicle is parked or stopped includes both when the vehicle operates and when the vehicle stops operating. Therefore, in the state where the vehicle is parked or stopped, the ANC function of the ANC system 790, which is disclosed in the present specification, reduces both the vehicle's engine noise and the vehicle's extraneous noise (including noise caused by the operation of the vehicle's heater and the cooling operation) when the vehicle operates and reduces the vehicle's extraneous noise when the vehicle stops operating.

In one or several embodiments disclosed in the present specification, the ANC system 790 may operate in conjunction with the execution of the pet mode while the vehicle travels. For example, while the vehicle travels, the ANC system 790 operates in a turned-on state when the pet mode is executed, and operates in a turned-off state when the pet mode stops being executed. Consequently, the noise from the engine can be reduced for pet care.

The ANC function of the vehicle may be activated on the basis of a user input or when a predetermined condition ('starting condition') is satisfied. After being activated, the ANC function may be deactivated on the basis of a user input or when a predetermined condition ('cancellation condition') is satisfied.

As illustrated in FIG. 8, to perform the ANC function of the vehicle 100, the ANC system 790 of the vehicle may include a noise sensing module, a noise sensing module (for example, a microphone), an audio output module (for example, anti-noise speakers), and a noise control module (for example, a controller processor).

The noise sensing module senses noise from the vehicle 100's engine, noise from the road surface/tire, and noise (not shown) from the vicinity of the vehicle that is parked or stopped, using a plurality of microphones installed on a plurality of positions on the vehicle 100. To this end, as illustrated, multiple microphones may be arranged at predetermined distances apart on each of the front and rear seats of the vehicle.

The audio output module outputs electronic component sound to counter the noise from the engine and/or the noise from the vicinity of the vehicle under the control of the noise control module, using the speakers mounted on the vehicle.

The noise sensing module senses the electronic component sound, which is output through the audio output module, and transfers the sensed electronic sound to the noise control module. The noise control module determines whether or not a change occurs in characteristic, by comparing data, obtained from actually measuring the received electronic component sound, with preset reference data. When the result of the comparison indicates that a change occurs in at least one of the following: a frequency response characteristic or a phase characteristic, it is concluded that the cancellation condition is satisfied. Consequently, the ANC function may be deactivated. If not, the ANC function is maintained in an activated state. Then, an active noise cancellation operation of outputting an antiphase signal for canceling noise may be performed through software control that uses a digital signal processor (DSP).

The starting and cancellation conditions for the ANC function in the present specification may be determined on the basis of the result of the monitoring in the pet mode. For example, when the result of the monitoring indicates that a change in the pet's movement is detected, it may be determined that the starting condition for the ANC function is satisfied. In addition, for example, when the result of the monitoring in the pet mode indicates that the change in the pet's movement is not further detected, even during the pet mode, it may be determined that the cancellation condition for the ANC function is satisfied.

Figure 9:
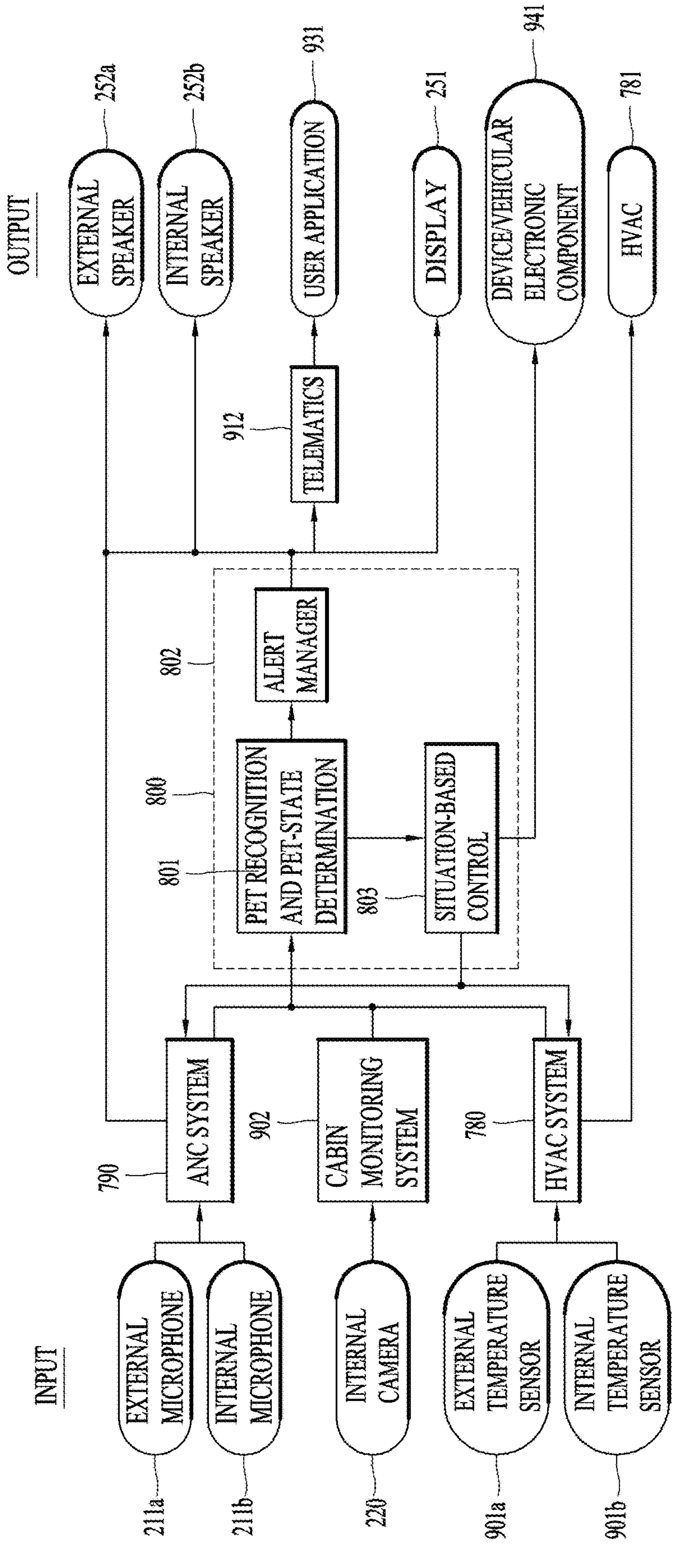
FIG. 9 is a block diagram that is referenced to describe recognition of a pet within the vehicle in accordance with the embodiment of the present disclosure, determination of the pet's state, an alert manager, and situation-based control.

FIG. 9 is a block diagram that is referenced to describe recognition of the pet within the vehicle in accordance with the embodiment of the present disclosure, determination of the pet's state, an alert manager, and situation-based control.

With reference to FIG. 9, an in-vehicle pet monitoring device 800 may operate in conjunction with the vehicle/a plurality of multiple input modules (input sensors) embedded in the vehicle, the ANC system 790 that operates using one or more of the plurality of input modules, a cabin monitoring system 902, the HVAC system 780, the vehicle/a plurality of output modules (output sensors) embedded in the vehicle, a cloud server, a telematics 912, and a service module that uses a user application 931, and the like. The cloud server performs communication using a wireless/wired communication scheme.

The in-vehicle pet monitoring device 800 may perform operations associated with pet recognition and pet-state determination 801, an alert manager 802, and situation-based control 803. Each operation is performed through a processor of the in-vehicle pet monitoring device 800 or a controller of the vehicle.

The pet recognition and pet-state determination 801 may include an operation of recognizing the pet within the vehicle, monitoring the pet's movement, and determining the pet's state. Specifically, the pet recognition and pet-state determination 801 recognizes the pet through the internal camera 220 of the vehicle, and continues to monitor the pet's state using the internal camera 220 of the vehicle and an internal microphone thereof. At this point, the cabin monitoring system 902 recognizes the pet and the pet's state, using a pre-trained model that operates in conjunction therewith. Then, the cabin monitoring system 902 feeds the recognized pet's state in real time or at predetermined time intervals to the pet recognition and pet-state determination 801.

The pet recognition and pet-state determination 801 feeds information about the pet's state to each of the alert manager 802 and the situation-based control 803 on the basis of the determined pet's state in such a manner that control and alarm are performed.

The situation-based control 803 adaptively controls the operations of the ANC system 790 and the HVAC system 780 when the pet mode is executed. Specifically, the situation-based control 803 may enable the ANC system 790 to activate the ANC function using an external microphone 211*a* and an internal microphone 211*b* of the vehicle. In addition, the situation-based control 803 may enable the HVAC system 780 to perform HVAC 781 and an air cleaning function to adaptively control cooling and warming by comparing values, measured by an external temperature sensor 901*a* and an internal temperature sensor 901*b* of the vehicle, with set temperature values.

The situation-based control 803 may adaptively control the operations of various devices/electronic components 941 inside and outside the vehicle on the basis of the pet's state monitored in the pet mode. Specifically, in a case where it is determined in the pet mode that the pet is in the anxious state, the situation-based control 803 may output content associated with the pet on the display unit 251, may activate the ANC system 790, may output specific sound or the guardian's voice through the internal speaker. In addition, in a case where it is determined in the pet mode that the pet is in a hungry state, the situation-based control 803 may also control a food dispenser within the vehicle in such a manner as to operate. In addition, in a case where it is determined in the pet mode that the pet is in a sleepy state, the situation-based control 803 may execute controls to help the pet fall asleep. These include adjusting the HVAC 781, turning off lighting inside the cabin, activating the ANC function, and similar operations.

In the pet mode, the situation-based control 803 may adaptively control the operations of various device/electronic components 941 on the basis of the monitored surrounding situation of the vehicle. For example, in a case where in the pet mode, a stranger approaches the vehicle, the situation-based control 803 may execute control to output visual information, indicating the presence of the pet within the vehicle, the state of the interior of the cabin, or approach prohibition, on the display 251, the window, or the like, or to project the visual information onto the ground near the vehicle, or the like. In addition, in the case where, in the pet mode, a stranger approaches the vehicle, the situation-based control 803, for example, may execute control to output audio information, indicating at least one of the following, through an external speaker 252*a* of the vehicle: the presence of the pet within the vehicle, the state of the interior of the cabin, or the approach prohibition.

The situation-based control 803 may adaptively control the operations of various devices/electronic components 941 inside and outside the vehicle by monitoring the pet within the vehicle in response to a specific situation (for example, the stranger's approach) in the vicinity of the vehicle. In this case, the situation-based control 803 may establish alert and call connections with the registered user terminal in conjunction with the alert manager 802 described below.

The alert manager 802 may provide information about the execution of the pet mode, the state of the interior of the cabin, the pet's state, the prohibition of the stranger's approach, and similar details inside or outside the vehicle. In addition, the alert manager 802 may transmit the result of the monitoring and the detection of the pet's anxious state in the pet mode to the registered user terminal. In addition, the alert manager 802 may provide images, acquired by internal and external cameras of the vehicle, through a preset application, in such a manner that in the pet mode, the guardian checks remotely the stranger's approach and the pet's state in response to the stranger's approach. In addition, in the pet's anxious state, the alert manager 802 may establish a video call connection with the registered user terminal or may provide an e-call service in an emergency situation.

The in-vehicle pet monitoring device, which is described in the present disclosure, may perform communication with at least one of the components provided in the vehicle. In addition, in the state where the vehicle is parked or stopped, the pet monitoring device may activate the sensors for monitoring the pet's movement and may execute the pet mode for monitoring the pet's state, on the basis of a preset input. In addition, while the pet mode is executed, the pet monitoring device may determine, based on the result of the monitoring by the sensors, that an amount of change in the pet's movement reaches or exceeds a reference range. On the basis of the result of such a determination, the pet monitoring device may generate a control signal for activating the ANC function equipped in the vehicle, may transmit the generated signal to the vehicle, and may transmit state information corresponding to the pet's movement to a registered external terminal.

The pet monitoring device described above may be controlled by the main controller of the vehicle.

Specifically, in the state where the vehicle is parked or stopped, on the basis of a preset input, a processor of the vehicle may execute the pet mode for monitoring the presence of the pet within the cabin and the pet's movement, using the internal camera and the internal microphone. The processor of the vehicle may determine, based on the result of the monitoring in the pet mode, that the amount of change in the pet's movement reaches or exceeds the reference range. On the basis of such a determination, the processor may activate the ANC function and may transmit the state information corresponding to the pet's movement to the registered external terminal through the communication module. Accordingly, the guardian of the pet may remotely check the pet's state and may minimize the pet's anxious state while the guardian is away from the pet.

Figure 10:
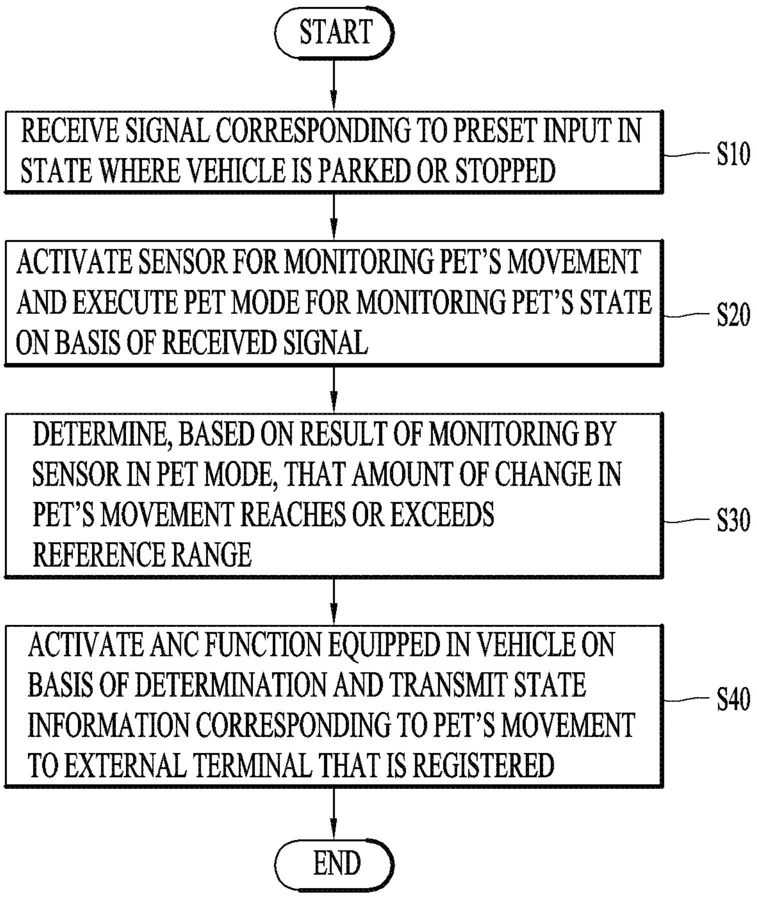
FIG. 10 is a representative flowchart that is referenced to describe a method of operating the vehicle in accordance with the embodiment of the present disclosure.

FIG. 10 is a representative flowchart that is referenced to describe a method of operating the vehicle in accordance with the embodiment of the present disclosure. Operations in steps in FIG. 10 may each be performed by a processor or the main controller of the vehicle/the in-vehicle pet monitoring device.

With reference to FIG. 10, in the state where the vehicle is parked or stopped, the method of operating a vehicle including an in-vehicle pet monitoring device according to an embodiment of the present disclosure starts by receiving a signal corresponding to a preset input and detecting the received signal (S10).

According to an embodiment, the signal corresponding to the preset input may be generated on the basis of an input applied to the vehicle/an input unit of the in-vehicle pet monitoring device. At this time, various examples of the input unit to which the input is applied may include a button, a touch screen, a voice input module (for example, a microphone), a camera, and similar devices. Various examples of an input technique may include a touch input, a push input, a voice command, a preset gesture, and similar techniques without any limitation.

In addition, in another embodiment, instead of the signal corresponding to the preset input, a signal corresponding to a user input may be received through a preset application from the user terminal operating in conjunction with the vehicle. For example, after the guardian parks or stops the vehicle, in a state where the pet is left alone within the vehicle, a user input for executing the pet mode described below may be entered by executing a preset application through the registered user terminal. Then, the signal corresponding to the user input is transferred to the vehicle/the in-vehicle pet monitoring device.

In response to receiving the signal corresponding to the preset input in this manner, the sensors (for example, the internal camera and the internal microphone of the vehicle) for monitoring the pet's movement within the vehicle are activated, and the pet mode for monitoring the pet's state is executed (S20).

In order to detect the pet that is left alone within the vehicle in a state where the pet mode is not executed, one or several of the sensors may operate before the pet mode is executed.

According to one or several embodiments, in a state where the vehicle is locked, the sensor, for example, the movement sensing sensor, or the internal camera within the vehicle, may be activated. When an object's movement (for example, the pet's movement) is detected as a result of the monitoring by the sensor, alert information may be transmitted to the registered user terminal. At this point, the alert information may include information requesting a determination of whether or not the pet mode is set, along with information indicating that the object's movement is detected within the vehicle.

Subsequently, according to an embodiment, when a response signal to the alert information is received, an activated state of the sensor may be maintained, and the pet mode may be executed. Specifically, when a positive response signal (for example, setting of the pet mode) is received in response to the alert information, the pet mode is executed. Conversely, when a negative response signal (for example, non-setting of the pet mode) is received in response to the alert information or when the response signal is not received within a predetermined time, the pet mode is not set.

Specifically, in the state where the vehicle is parked or stopped, the vehicle is door-locked. In the state where the pet mode is not executed, the sensor, for example, the movement sensing sensor, or the internal camera for detecting the pet's movement within the vehicle may be activated for at least a predetermined time. Subsequently, when the object's movement within the vehicle is detected through the movement sensing sensor or the internal camera, alert information requesting a determination of whether or not the pet mode is executed may be transmitted to the registered user terminal, before the alarm (for example, a vehicle theft prevention function) is output. For example, the message saying, "Shall I execute the pet mode" and a link to an application for execution may be transmitted to the registered user terminal.

In still another embodiment, Step S10, which is described above, that is, the user input operation may be omitted, and the pet mode may be set to be automatically executed when a preset condition is only satisfied. For example, in the state where the vehicle is parked or stopped, the doors of the vehicle are locked, an object within the vehicle is detected through the movement sensing sensor or the camera, and the sound (for example, the sound of dog barking, the sound of child crying, and the like) collected through the internal microphone exceeds a predetermined decibel (dB) level. In this case, the pet mode may be automatically executed regardless of whether or not the user input is applied. However, even in this case, alert information indicating that the pet mode is automatically executed may be transmitted to the registered user terminal.

When the pet mode is executed in this manner because the user input is applied or the preset condition is satisfied, the HVAC is automatically adjusted in such a manner that the interior of the cabin reaches an appropriate temperature, and the pet's movement continues to be monitored through the activated sensor. At this point, an appropriate temperature for cooling and warming operations through the HVAC may be set to a preset value or may vary within a predetermined range on the basis of the difference between the temperature outside the vehicle and the temperature inside the vehicle.

As a result of the monitoring in the pet mode, the processor may determine that the amount of change in the pet's movement reaches or exceeds the reference range (S30). At this point, the reference range is a movement range, based on which the need to monitor the pet's state is determined, and may refer to a greater amount of movement than normal, considering the trained model/learned data.

In addition, in one or several embodiments, in a case where the amount of change in the pet's movement reaches or exceeds the reference range, the processor may turn on the internal microphone of the vehicle, may collect sound from inside the cabin (for example, the sound of dog barking or the like), and may use the collected sound as information for accurately recognizing the pet's state.

Subsequently, in a case where it is determined that the amount of change in the pet's movement, the processor may activate the ANC function equipped in the vehicle, and may transmit the state information corresponding to the pet's movement to the registered user terminal (S40).

Specifically, in a case where the pet is actively moving, the processor determines that the pet is in the anxious state. Thus, the process may activate the ANC function, thereby helping to keep the pet relaxed, which is sensitive to noise. In addition, the processor may record and store state information, such as the time during which the pet's anxious state continues, the number of times that the amount of change in the pet's movement increases, and the current image of the interior of the cabin, and may transmit the state information to the registered user terminal through the telematics and the cloud.

In addition, the processor may determine the pet's state, for example, whether the pet is in the anxious state, in the sleepy state, or in the hungry state, on the basis of the result of the monitoring in the pet mode. At this point, when only with the amount of change in the pet's movement, it is difficult to recognize the pet's state, the processor may sequentially perform intervention operations, additionally considering various situational contexts.

For example, when it is determined that the pet is in the anxious state, the processor first outputs the guardian's recorded voice or specific sound through the internal speaker of the vehicle (a first intervention operation). Subsequently, in a case where the pet continues to be in the anxious state, the processor plays back pet-associated content on the display inside the vehicle (a second intervention operation). Next, the processor may attempt to feed the pet by operating the food dispenser (a third intervention operation).

In addition, the processor may selectively operate the vehicular electronic component corresponding to the pet's state, on the basis of both the pet's state, determined on the basis of the result of the monitoring, and a pre-learned intervention event.

For example, in a case where the pet is in the sleepy state, the processor may turn off lighting inside the cabin and may output sleep-inducing sound through the internal speaker of the vehicle. In addition, for example, in a case where the pet is in the anxious state due to the stranger's approach, the processor may operate to output the guardian's voice, saying 'Wait, (the pet's name)!', as a command voice, through the internal speaker of the vehicle, and to output an approach prohibition warning alarm through the external speaker and the window of the vehicle.

These multiple intervention operations may be learned and updated by monitoring the pet's response thereto. For example, in the example described above, in a case where the pet's anxious state is alleviated after performing the second intervention operation (that is, playing back the pet-associated content), subsequently, when the pet's anxious state is detected, the second intervention operation may be performed in preference to the first intervention operation.

In addition, in a case where it is determined that the amount of change in the pet's movement reaches or exceeds the reference range, the processor may monitor the vicinity of the vehicle to identify the cause of the pet's anxious state and may output the alert information.

For example, the processor may monitor whether a stranger, an animal, an object, or the like is present in the vicinity of the vehicle or approaches the vehicle, while concurrently performing the various intervention operations described above. Then, the processor may display information, such as the pet's presence, the pet's state, and an approach prohibition alert, on the display and the window of the vehicle, and may project the information onto the ground.

In one or several embodiments, even while the amount of change in the pet's movement falls within the reference range, the processor may continue to monitor the interior of the cabin and may determine, based on the analysis of the images collected through the internal camera, that the pet's state needs to be monitored. Then, the processor may perform an appropriate situation-based intervention operation on the basis of the result of the determination.

In the present specification, in this manner, while the pet mode is executed, the interior and surroundings of the vehicle continue to be monitored, and a pet-friendly content screen, feeding, soothing sound, and the like, along with optimal temperature, fresh air, and an extraneous noise reduction function, are provided in a tailored manner inside the cabin. Consequently, the pet left alone within the vehicle remains relaxed while the guardian moves away from the pet. In addition, in a case where the guardian of the pet unintentionally fails to set the pet mode, the pet's movement is detected, and thus the pet mode setting is triggered through the terminal, or the pet is monitored to ensure at least the pet's safety. Consequently, the pet left alone within the vehicle can be safely protected.

Figure 11:
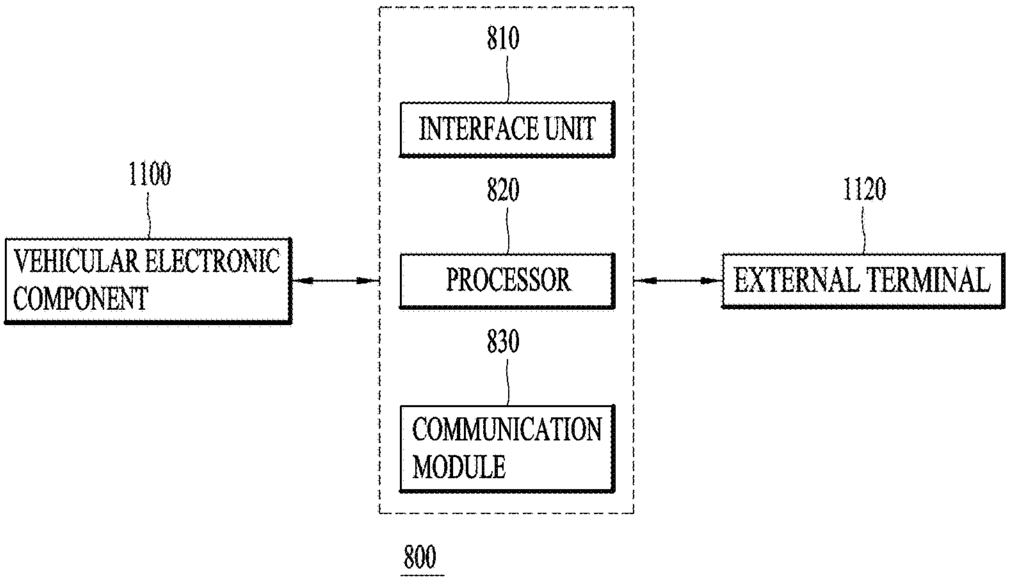
FIG. 11 is a block diagram illustrating an exemplary configuration of an in-vehicle pet monitoring device in accordance with an embodiment of the present disclosure.

FIG. 11 is a block diagram illustrating an exemplary configuration of the in-vehicle pet monitoring device in accordance with the embodiment of the present disclosure.

With reference to FIG. 11, the in-vehicle pet monitoring device 800 may transfer a signal for operating a vehicular component 1100 to the vehicle through an interface unit 810 and may communicate with external terminal 1120, for example, the registered user terminal, through a communication module 830.

At this point, examples of the vehicular component 1100 may include input sensors, output sensors, an ANC system, an HVAC system, and other electronic components (for example, doors, windows, and a food dispenser), which are installed in the vehicle. The input sensors include a camera, a microphone, and the like, and the output sensors include lighting, a speaker, a display, a projector, and the like. In addition, a predetermined application associated with the pet is pre-installed on the external terminal 1120, and the pet mode may be executed, controlled, and terminated through this application.

In the state where the vehicle is parked or stopped, a processor 820 of the in-vehicle pet monitoring device 800 may execute the pet mode for the vehicle on the basis of an input received through the input module (not illustrated).

When the pet mode is executed, the processor 820 may activate the sensors for monitoring the pet's movement, for example, the movement sensing sensor, and the internal camera of the vehicle by communicating with the vehicular component 1100. Furthermore, the processor 820 may transfer to the vehicle a control signal ('first control signal') for operating the sensors for monitoring the pet's state, for example, the internal camera, the internal microphone, and the like of the vehicle.

The processor 820 may use a pre-trained model that operates in conjunction with the cabin monitoring system 902, in order to analyze the pet's state, and may transfer to the vehicle a control signal ('second control signal') for performing an intervention operation corresponding to the pet's state.

The processor 820 may monitor the pet's response to performing the intervention operation corresponding to the pet's state and may learn the intervention operation on the basis of the result of the monitoring. Thus, the processor 820 may later operate to provide a tailored pet care service.

The processor 820 may determine, on the basis of the result of the monitoring in the pet mode, that the amount of change in the pet's movement reaches or exceeds the reference range. Furthermore, the processor 820 may generate a control signal ('third control signal') for activating the ANC function of the vehicle on the basis of the result of the determination and may transfer the generated control signal to the vehicle through the interface unit 810. In addition, based on the result of the monitoring in the pet mode, the processor 820 may transmit the state information corresponding to the pet's movement to the registered external terminal 1120 through the communication module 830. At this point, the state information may include one or more of the following: an image of the interior of the cabin, which includes the pet, information (for example, a state expression in the form of a pictograph) indicating the pet's current state, sound from inside the cabin, or the accumulated time during which the pet mode is executed.

In addition, the processor 820 may attempt to establish a video call connection with the external terminal 1120 to keep the pet relaxed. In addition, in a case where it is determined in the pet mode that an emergency situation occurs, the processor 820 may transmit a relief request to e-Call.

While the pet mode is executed, the processor 820 may monitor whether or not a stranger, an animal, or another object (hereinafter collectively referred to as a stranger) approaches the vehicle, and may transmit the result of the monitoring to the registered external terminal 1120 through the communication module 830.

At this point, the result of the monitoring may include the presence or absence of the stranger's approach, the approach distance, the number of times the vehicle was knocked on, and similar data, and may be displayed along with the above-described state information in a synchronized manner. For example, when a stranger approaches the vehicle closely, the result of the monitoring of this approach, including the pet's state, may be transmitted to the external terminal 1120.

Figure 12:
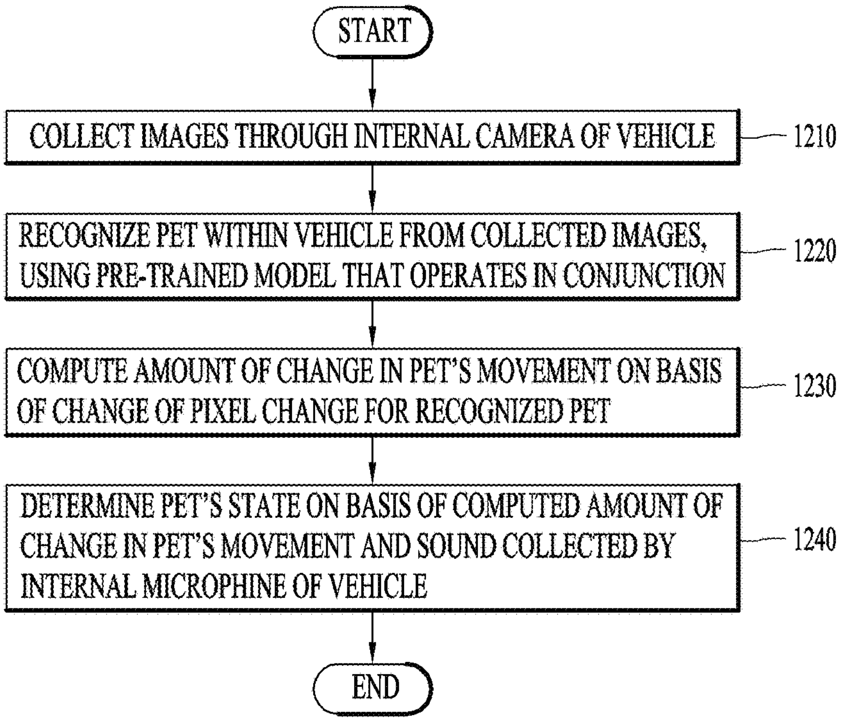
FIGS. 12 and 13 are views associated with the recognition of the pet within the vehicle in accordance with the embodiment of the present disclosure and the determination of the pet's state.
Figure 13:
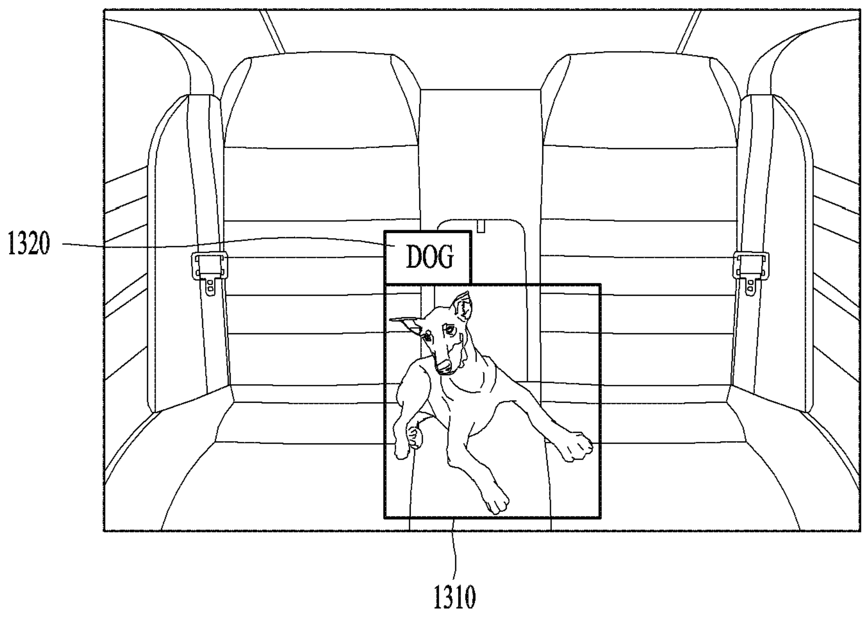

FIGS. 12 and 13 are views associated with the recognition of the pet within the vehicle in accordance with the embodiment of the present disclosure and the determination of the pet's state.

Specifically, FIG. 12 is the flowchart illustrating specific operations, associated with the pet recognition and pet-state determination 801, by the in-vehicle pet monitoring device 800 in FIG. 9. The operations in FIG. 12, as described above, may be performed through the processor of the in-vehicle pet monitoring device 800 and the main controller of the vehicle.

With reference to FIG. 12, the method starts with a step of collecting images of the interior of the cabin through the internal camera within the vehicle (1210). The images of the interior of the cabin may be collected in real time or at predetermined time intervals while the pet mode is executed. The images of the interior of the cabin may be recorded in the format of a still image or a moving image on the basis of the setting and may be stored in the cloud server.

Subsequently, a step of recognizing the pet within the vehicle from the collected images using a pre-trained model that operates in conjunction with the cabin monitoring system 902 (1220).

The pre-trained model that operates in conjunction is used to recognize the pet's type and location that are included in the collected images.

For example, the processor may recognize whether the pet within the vehicle is a dog or a cat, using the pre-trained model that operates in conjunction, for example, a pre-trained image recognition algorithm model. In addition, for example, the processor may recognize which seat within the vehicle—the front seat, the passenger seat, or the rear seat—the pet is located in, by analyzing the pixels of the collected images.

According to an embodiment, the recognized pet may be displayed on the display within the vehicle and/or transmitted to the registered user terminal, along with an annotation about the recognized pet.

For example, as illustrated in FIG. 13, in a case where the pet is recognized through the internal camera of the vehicle, a screen may be displayed on the user terminal or the display within the vehicle. The annotation 1320 in the form of text, indicating the pet's type, is shown on the screen, along with a frame 1310 in the form of a box. In this manner, when the pet is recognized, the processor extracts data for the pet's location coordinates within the image in order to detect the amount of change in the pet's movement, which is described below.

In one or several embodiments, in a case where the pet within the vehicle wears an identification tag (for example, a body-embedded chip/identification tag of a companion animal), the pet may be distinctively recognized by scanning the identification tag.

In this manner, when the pet within the vehicle is recognized, the pet's state is monitored. Specifically, in a case where the pet within the vehicle is recognized, the amount of change in the pet's movement is computed from the collected images, by monitoring an amount of pixel change for the recognized pet (1230).

For example, in FIG. 13, edge coordinate values {x1, x2, y1, y2} of the frame 1310, as initial pixel data for the recognized pet, may be plotted and recorded, and coordinate values {x1", x2", y1", y2"} corresponding to the pixel change over time may be detected. In addition, the amount of pixel change that occurs due to the pet's movement may be computed on the basis of a difference between pixel data for a previous image frame and pixel data for a current image frame. Then, the level of the pet's movement may be computed on the basis of the amount of pixel change.

With the initial pixel data for the recognized pet in FIG. 13, the frame 1310 may also be used to analyze the pet's behavior to recognize the pet's state. For example, the pet's various motions (for example, tail wagging, frequent yawning, nose licking, tooth baring, continuous ear movement, ear or tail positioning (dropping or wagging), vehicle-seat scratching, and others) and the amounts of change in the pet's movement may be aggregated and used as data for determining the pet's state.

Subsequently, the processor may aggregate the amounts of change in the pet's movement and sound collected by the internal microphone of the vehicle and thus may determine the pet's state (1240). Examples of the pet's state may include the anxious state (for example, a worried state, a feared state, or a state of urgency to defecate), the sleepy state, and the hungry state.

According to an embodiment, the processor may transfer, to the vehicle, data associated with the pet's movement, data associated with the pet's sound, and information associated with the pet's state determined on the basis of these data. Then, operations by the situation-based control 803 and the alert manager 802, which use the components within the vehicle, are triggered to be performed.

In addition, according to an embodiment, the processor may electively operate the vehicular electronic component corresponding to the pet's state, on the basis of the pet's determined state and the pre-trained intervention event. That is, the intervention operation corresponding to the pet's state may be selectively performed or performed in a modified manner, on the basis of learning.

According to an embodiment, in the pet mode, the object's movement in the vicinity of the vehicle may be monitored using the external camera or the like of the vehicle.

In addition, in one or several embodiments, in the pet mode, in a case where the amount of change in the pet's movement, which is detected through the internal camera of the vehicle, reaches or exceeds the reference range, the external camera of the vehicle may be activated to monitor whether or not an object in the vicinity of the vehicle approaches the vehicle. That is, the external camera may operate to monitor the object in the vicinity of the vehicle on the basis of a change in the state of the pet within the vehicle.

Figure 14:
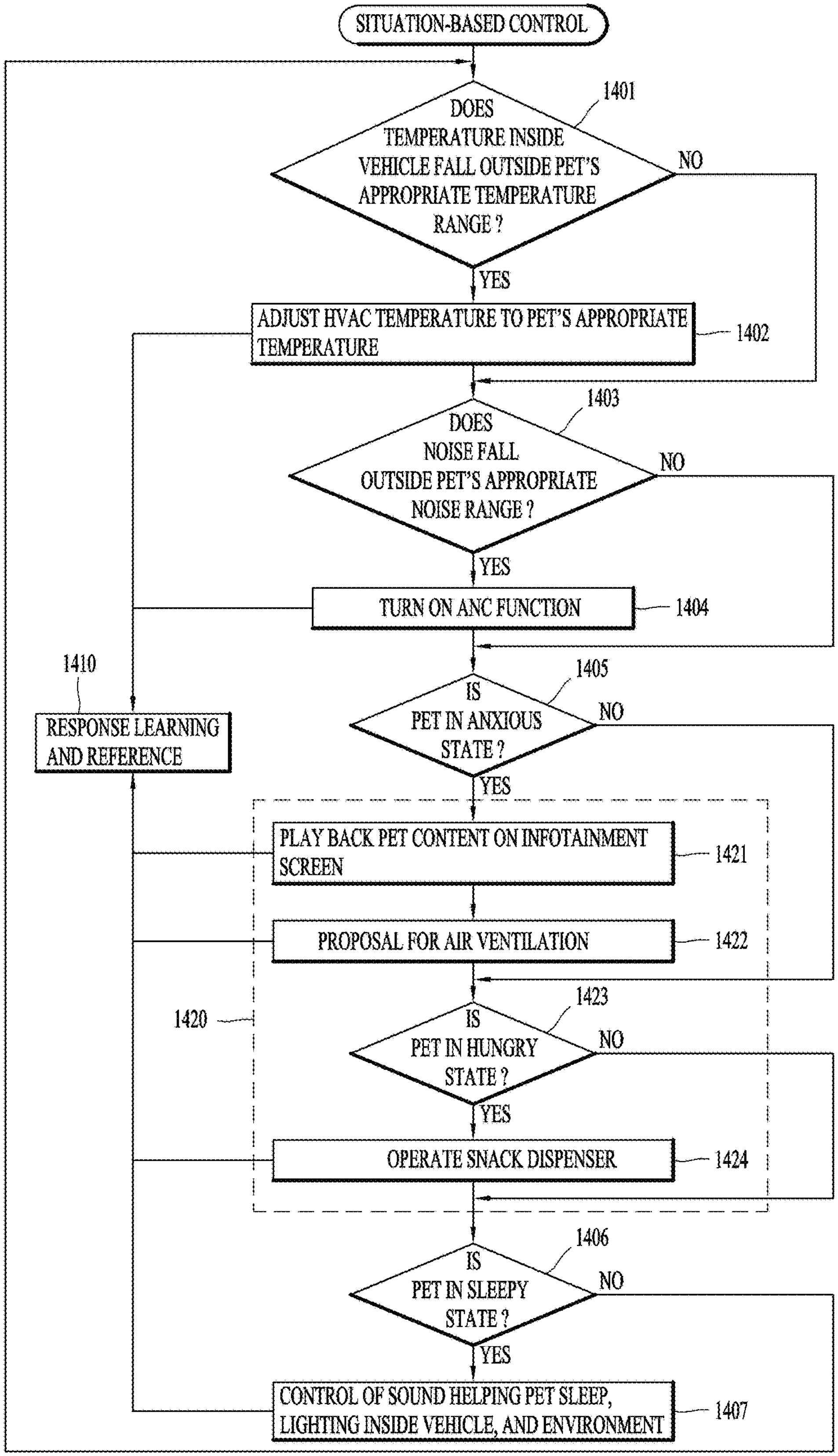
FIG. 14 is views associated with the alert manager based on the state of the pet within the vehicle in accordance with the embodiment of the present disclosure.

FIG. 14 is views associated with the alert manager based on the state of the pet within the vehicle in accordance with the embodiment of the present disclosure.

That is, FIG. 14 is the flowchart for specific operations associated with the situation-based control 803 by the in-vehicle pet monitoring device 800 in FIG. 9. The operations in FIG. 14, which are disclosed below, may be performed by the processor of the in-vehicle pet monitoring device or the main controller of the vehicle.

With reference to FIG. 14, the processor continues to monitor whether or not the temperature inside the vehicle falls outside the pet's appropriate temperature range (1401). In a case where the temperature inside the vehicle falls outside the pet's appropriate temperature range, the processor adjusts the pet's temperature by operating the HVAC system 780 until the pet's appropriate temperature is reached (1402).

Concurrently or sequentially, the processor continues to monitor whether or not noise from inside the cabin falls outside the pet's appropriate noise range (1403). In a case where the noise falls outside the appropriate noise range, the processor may adjust a noise range by activating the ANC system 790 (1404).

In one or several embodiments, even though the noise falls within the appropriate noise range, the processor may activate the ANC function on the basis of the pet's state. For example, in a case where the pet is in the sleepy state, the processor may activate the ANC function at a point in time when the sleep state is detected (or determined), in such a manner as to create an atmosphere that helps the pet fall asleep.

The processor may perform response learning and reference 1410 on the basis of the operations of the HVAC system 780 and the ANC system 790 and the monitoring of the pet's state by the operations thereof. Then, pet-tailored control may be executed by performing update on the basis of the monitoring of the pet's state.

Subsequently, the following optional operations may be performed on the result of monitoring the pet. The optional operations may also be performed not only in the state where the vehicle is parked or stopped, but also in the state where the vehicle travels.

Specifically, as a result of the monitoring, the processor may determine the pet's anxious state (1405). At this point, the presence or absence of the pet's anxious state may be determined on the basis of the result of collecting and analyzing the images of the interior of the cabin and the sound from inside the cabin. For example, the result of monitoring the collected images of the interior of the vehicle shows that the pet defecates in the wrong place, licks its nose, continues to move in a circle in the same place, barks, continues to howl, lowers its tail, or continues to move its ears backward and forward. These motions may be determined to indicate the anxious state. In addition, a pre-trained behavior learning model may be referenced to determine the pet's state in this manner.

The operation 1420 for relieving the pet's anxious state may selectively include an operation suited to induce the pet's relaxation, based on the behavioral analysis of the pet's state. For example, in a case where the pet barks loudly in the anxious state, an operation of outputting the guardian's voice, saying '(the pet's name), don't bark!' may be selected. In contrast, for example, in a case where the pet tucks its tail or lowers its ears in the anxious state, an operation of playing back pet-associated content favored by the pet may be selected.

The operation 1420 for relieving the pet's anxious state may be varied or updated on the basis of the response learning and reference 1410. In addition, the multiple operations 1420 may be performed sequentially or concurrently.

Specifically, the processor may perform an operation of playing back content for the pet on an infotainment screen by controlling the display within the vehicle (1421). At this point, the content for the pet includes a preset pet-associated channel, a pre-stored pet-associated picture, an image or video favored by the pet, and the like.

In addition, the processor may generate a control signal for requesting a proposal for air ventilation directed toward the seat on which the pet sits and may transfer the generated control signal to the main controller of the vehicle. In this case, the main controller of the vehicle may make a request for permission to open the window near the seat to a preset level for air ventilation. At this point, the request for permission may be displayed on the display within the vehicle while the vehicle travels and may be transmitted to the registered user terminal while the vehicle is parked or stopped. The window near the seat on which the pet sits may be opened to the preset level for air ventilation on the basis of a response to the request for permission.

In addition, as a result of the monitoring, the processor may determine whether or not the pet is in the hungry state (1423). At this point, in a case where the pet appears low on energy, licks the floor, or performs similar actions, the processor may determine that this indicates the pet's hungry state, and may perform an operation of extending the food dispenser installed within the vehicle (1424).

Then, after monitoring the pet's response to the extended food dispenser, the processor may perform the response learning and reference 1410, may record the pet's response (for example, whether the pet eats the food or shows no interest in the food), and may transmit the pet's response to the user terminal.

At this point, according to an embodiment, the processor may output a voice that induces feeding, for example, the guardian's pre-stored voice saying '(the pet's name), eat the snack' through the audio output unit (for example, the internal speaker of the vehicle) provided inside the vehicle.

In addition, as a result of the monitoring, the processor may determine whether or not the pet is in the sleepy state (1406). At this point, whether or not the pet is in the sleepy state may be determined by the pet's pose (for example, a lying position), the pet's eye blinking, whether or not the pet's eyes are closed, the number of times the pet yawns, and similar factors.

When it is determined that the pet is in the sleepy state, the processor may execute control in such a manner that sound or a sound source that induces the pet to fall asleep is output through the internal speaker of the vehicle. Moreover, the processor may perform a setting operation to create a sleep-inducing environment, such as turning off lighting within the cabin (1407).

As a result of monitoring the pet's state, the response learning and reference 1410 described above may record an operation corresponding to the pet's state and the pet's response to the operation. Furthermore, the response learning and reference 1410 may update the next result of the monitoring and an operation corresponding thereto in a varying manner on the basis of the pet's response to the operation.

For example, in a case where it is monitored that the pet licks its nose and where the food dispenser, the air ventilation, and the infotainment screen are sequentially provided as intervention operations, it may be monitored that the pet's anxious state is relieved in response to the infotainment screen. In this case, the next time the pet's anxious state is monitored, the infotainment screen may be provided as the first intervention operation.

The pet mode disclosed in the present disclosure may also be activated while the vehicle is driven. However, in this case, since the pet is not left alone within the vehicle, the pet mode may be executed in a different manner than in the state where the vehicle is parked or stopped.

In this case, state information corresponding to the pet's movement may be displayed on the display within the vehicle, or a guidance voice explaining the pet's state may be output through the internal speaker.

Figure 15:
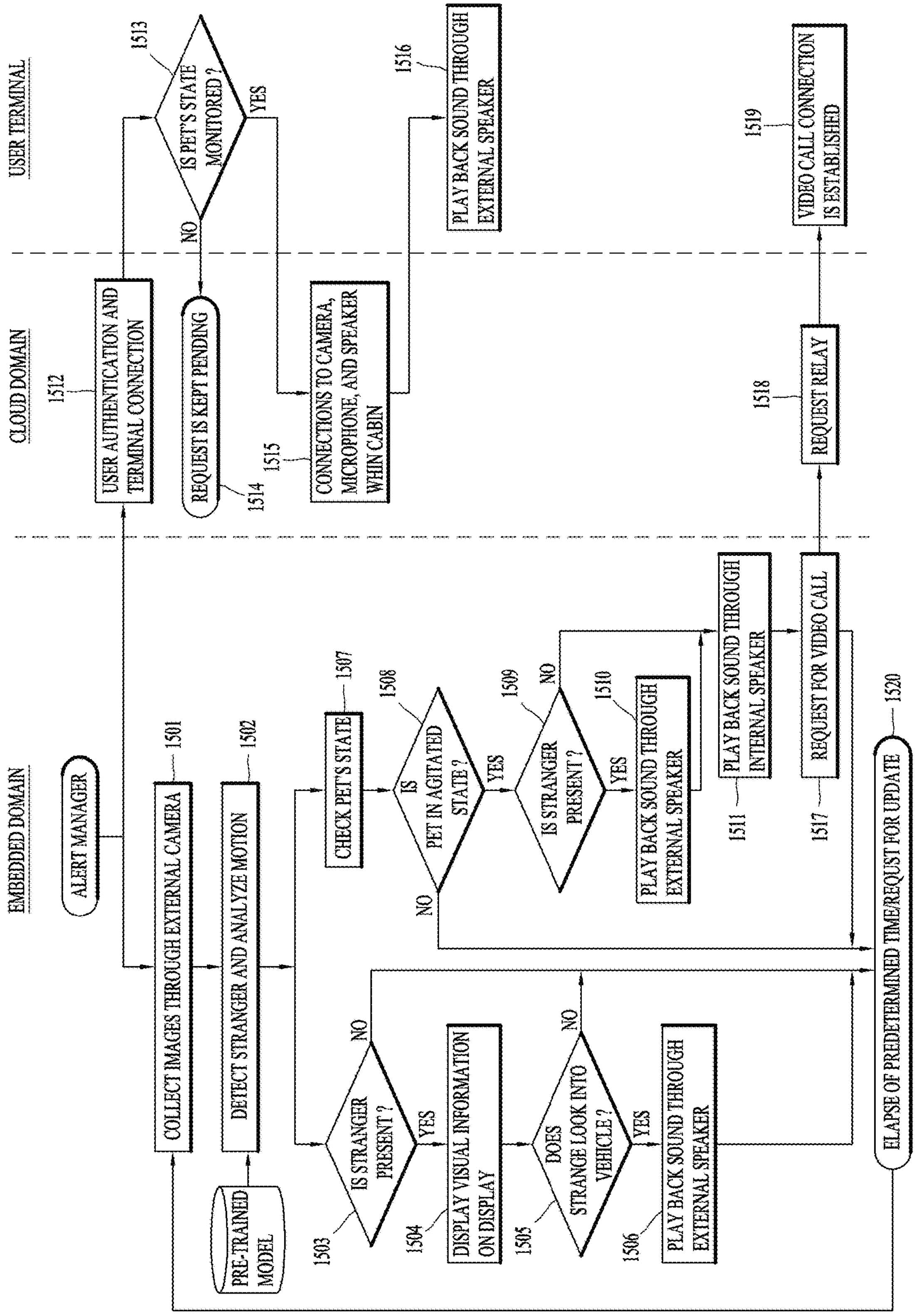
FIGS. 15 and 16 are views associated with the situation-based control based on the state of the pet within the vehicle in accordance with the embodiment of the present disclosure.
Figure 16:
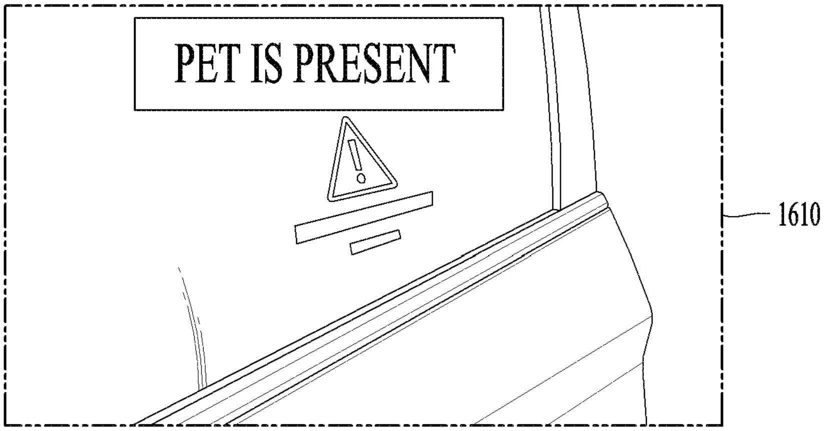
Figure 16:
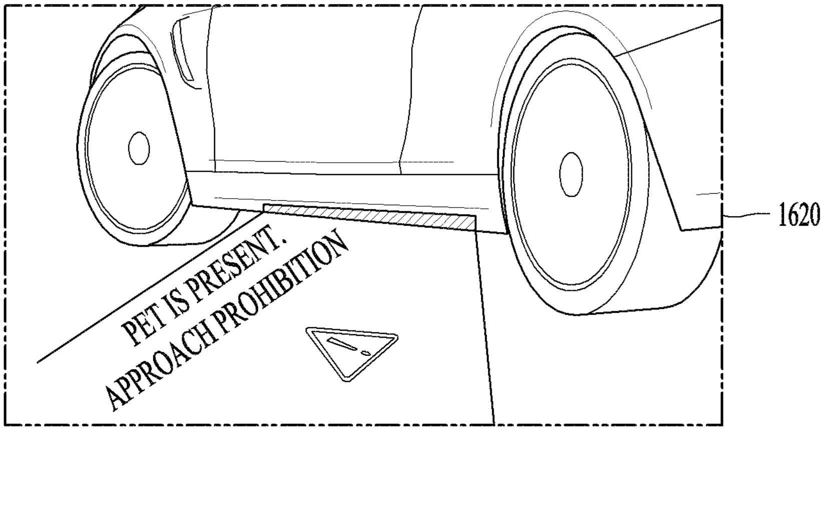

FIGS. 15 and 16 are views associated with the situation-based control based on the state of the pet within the vehicle in accordance with the embodiment of the present disclosure.

FIG. 15 illustrates operations associated with the alert manager 802 by the in-vehicle pet monitoring device 800 in FIG. 9. To this end, the in-vehicle pet monitoring device 800, the vehicle 100, or the vehicular component 1100 may operate in conjunction with the cloud and the user terminal. In addition, the processor of the in-vehicle pet monitoring device, the main controller of the vehicle, or the processor thereof/the main controller may operate in conjunction with the cloud and/or the processor of the user terminal to perform the operations illustrated in FIG. 15.

The images of the surroundings of the vehicle may be collected through the external camera of the vehicle by the alert manager 802 (1501). Then, using the pre-trained model that operates in conjunction with the pet monitoring device 800, an object in the vicinity of the vehicle, for example, a stranger may be detected, and a motion of the stranger may be analyzed (1502).

As a result of the monitoring, it may be determined whether or not a stranger is present (1503), and visual information may be displayed on an internal display of the vehicle on the basis of the determination (1504). At this point, for example, the current temperature inside the cabin, the alert information indicating the execution of the pet mode in progress, and the pet's state may be displayed on the internal display of the vehicle.

It is determined, based on the analysis of the motion of the stranger, whether or not the stranger looks into the vehicle (1505). When it is determined that the stranger looks into the vehicle, a sound, indicating an approach warning/the execution of the pet mode in progress, may be played back through the external speaker of the vehicle (1506). In addition, a warning mark, indicating the approach prohibition, may be output on the internal display of the vehicle or an external window of the vehicle, or may be projected onto the ground.

For example, a warning message saying, 'Approach prohibited, the pet is present!' may be displayed on the internal/external display of the vehicle or the window or may be projected onto the ground.

For example, as illustrated in (a) of FIG. 16, visual information 1610, indicating that the pet is present within the vehicle, may be displayed on the window in the direction that a stranger approaches or may be output to the display (not illustrated) within the vehicle. At this point, the visual information 1610 may include information indicating the current temperature inside the vehicle and the pet's state.

In addition, for example, in a case where a stranger touches the vehicle or looks closely into the vehicle, as illustrated in (b) of FIG. 16, visual information 1620, indicating the presence of the pet within the vehicle and an approach prohibition warning, may be projected onto the ground. Moreover, a warning sound, indicating the approach prohibition, may also be output.

While the monitoring is performed by collecting the images of the surroundings of the vehicle through the external camera of the vehicle, the state of the pet within the cabin is concurrently checked using the internal camera or the like of the vehicle (1507).

It is determined, based on the result of monitoring the pet's state, whether or not the pet is in an agitated state (1508). In a case where the pet is in the agitated state, it is determined that a stranger is detected outside the vehicle (1509). That is, it is monitored whether or not a condition outside the vehicle causes the pet's agitated state.

On the basis of the determination in Step 1509, when a stranger is present, a sound, indicating the approach warning/the execution of the pet mode in progress, is played back through the external speaker of the vehicle (1510), or the visual information is displayed on the external display/the internal display of the vehicle (1506).

For example, the current temperature inside the cabin, the alert information indicating the execution of the pet mode in progress, and the pet's state may be displayed on the internal display of the vehicle. In addition, according to an embodiment, the vehicle may be door-locked. In addition, according to an embodiment, after the approach warning is output, a subsequent alert (for example, when the vehicle is damaged, you may be liable for damages) may be displayed sequentially. In contrast, in a case where a stranger is not detected in the pet's agitated state, an internal sound or sound source stored in the vehicle for relieving the agitated state of the pet within the vehicle is played back (1511).

When the pet's agitated state is not relieved within a predetermined time, a request for a video call may be transmitted to the registered user terminal (1517). At this point, since the pet cannot make a call request, the cloud relays the call request instead (1518). When the cloud relays the call request, an attempt is made to establish a video call connection with the user terminal, allowing the guardian to make a video call with the pet (1519).

When the alert manager 802 by the in-vehicle pet monitoring device 800 starts, a request 1512 for user authentication and terminal connection may be transmitted to the user terminal through the cloud. After the request 1512 is transmitted, it is determined whether or not the pet's state is monitored through the user terminal (1513). When the monitoring by the user terminal is not in progress, the request 1512 is kept pending. When the monitoring by the user terminal is in progress, the user terminal attempts to establish connections to the camera, the microphone, and the speaker within the cabin, thereby preparing for a video call (1515). Accordingly, a video call connection is established through the user terminal (1516).

In addition, according to an embodiment, the processor may record the accumulated time during which the pet is left alone within the vehicle. The accumulated time may be computed by counting from the time at which the pet mode is set in the state where the pet is left alone within the vehicle, or from the time at which the pet's movement within the vehicle is detected in a state where the pet mode is not set.

According to an embodiment, a reporting process for the pet's safety may be triggered when an occupant does not return to the vehicle and the pet mode is not requested from the user terminal until the accumulated time during which the pet is left alone within the vehicle reaches a threshold time (4 hours or longer, or 5 hours or longer). However, even in this case, the pet mode also remains active to minimize the pet's anxious state.

In addition, in the pet mode, it may be determined, based on the result of monitoring an object in the vicinity of the vehicle through the external camera of the vehicle, that the object approaches the vehicle. At this time, the processor may concurrently execute the situation-based control both inside and outside the vehicle.

Specifically, in a case where it is determined that an object approaches the vehicle, a sound and/or an image, inducing the pet's relaxation, may be output through a first output module (for example, the internal speaker and/or the display) provided inside the vehicle. Moreover, information, indicating the execution of the pet mode in progress, may be output through a second output module (for example, the display, the window, the projector, the external speaker, or the lamp) provided on the exterior of the vehicle, and the approach prohibition warning may be output.

According to an embodiment, in the pet mode, when it is monitored that the ANC function is enabled and that the amount of change in the pet's movement does not reach the reference range, the processor may maintain or change a deactivated state of the ANC function.

As described above, according to one or several embodiments of the present disclosure, in response to the execution of the pet mode in the state where the pet is left alone within the vehicle, the interior and surroundings of the vehicle can continue to be monitored, and a pet-friendly content screen, feeding, soothing sound, and the like, along with optimal temperature, fresh air, and an extraneous noise reduction function, can be provided inside the vehicle. In addition, these operations may be appropriately modified based on the result of monitoring the pet's current state and then provided. Thus, even while the guardian is not present, the pet can remain relaxed. In addition, in the state where the pet is left alone within the vehicle, in the case where the guardian of the pet unintentionally fails to set the pet mode, the pet's movement is detected, and thus the pet mode setting is triggered through the user terminal, or the pet is monitored to ensure at least the pet's safety. Consequently, the pet left alone within the vehicle can be safely protected. In addition, in a case where the pet is left alone within the vehicle and where the pet's anxious state continues while the pet mode is executed, the cause of the pet's anxious state is identified, and the pet's relaxation is achieved by performing an appropriate intervention operation for the interior and/or surroundings of the vehicle. Furthermore, learning is performed on the basis of the pet's response to the intervention operation. Consequently, tailored pet care may be provided thereafter.

The present disclosure can be implemented as computer-readable codes (applications or software) in a program-recorded medium. The control method of the autonomous vehicle described above can be implemented using codes stored in memory, etc.

The computer-readable medium may include all types of recording devices each storing data readable by a computer system. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device and the like, and may also be implemented in the form of a carrier wave (e.g., transmission over the Internet). Also, the computer may include a processor or a controller. Therefore, the detailed description should not be limitedly construed in all of the aspects, and should be understood to be illustrative. The scope of the present disclosure should be determined by reasonable interpretation of the appended claims, and all changes within the equivalent scope of the present disclosure are embraced by the appended claims.

The invention claimed is:

1. A vehicle comprising:

a sensor that is provided inside the vehicle and monitors a pet's movement;

a noise control module that controls the operation of an active noise cancellation (ANC) function equipped in the vehicle;

a communication module for communicating with an external terminal that is registered;

output modules that are provided in the interior and on the exterior of the vehicle, respectively; and a processor that, on the basis of a preset input in a state where the vehicle is parked or stopped, activates the sensor and executes a pet mode for monitoring the pet's state, wherein the processor determines, based on the result of the monitoring by the sensor in the pet mode, that an amount of change in the pet's movement reaches or exceeds a reference range, controls the noise control module in such a manner as to activate the ANC function on the basis of the determination, and transmits state information corresponding to the pet's movement to the external terminal through the communication module.

2. The vehicle of claim 1, wherein the processor activates the sensor in a locked state of the vehicle and, in response to detection of the pet's movement based on the result of the monitoring by the sensor, transmits alert information to the external terminal.

3. The vehicle of claim 2, wherein, when a response signal to the alert information is received through the communication module, the processor maintains an activated state of the sensor and executes the pet mode.

4. The vehicle of claim 1, wherein, when the pet mode is executed, the processor actively controls an operation of turning on or off an internal air-conditioning system for maintaining the temperature inside the vehicle within a predetermined range and an operation of turning on or off the ANC function for maintaining a noise level within a predetermined range.

5. The vehicle of claim 1, wherein the sensor is an internal camera of the vehicle, and the processor recognizes the pet from images collected through the internal camera using a pre-trained model that operates in conjunction with a system, computes the amount of change in the pet's movement on the basis of an amount of pix change for the recognized pet, and determines the pet's state on the basis of the amount of change in the pet's movement and sound collected by a microphone provided inside the vehicle.

6. The vehicle of claim 5, wherein the processor selectively operates a vehicular electronic component corresponding to the pet's state, on the basis of the pet's determined state and a pre-learned intervention event.

7. The vehicle of claim 1, further comprising:

a display that is provided inside the vehicle and on which at least one content item is displayed, wherein, when the result of the monitoring by the sensor in the pet mode indicates that the amount of change in the pet's movement reaches or exceeds the reference range, the processor executes control in such a manner that video content associated with the pet is displayed on the display.

8. The vehicle of claim 1, further comprising:

an external camera that is provided on the exterior of the vehicle and monitors an object's movement in the vicinity of the vehicle, wherein, when the result of the monitoring by the sensor in the pet mode indicates that the amount of change in the pet's movement reaches or exceeds the reference range, the processor activates the external camera and, using the external camera, monitors whether or not the object approaches the vehicle.

9. The vehicle of claim 8, wherein the processor determines, on the basis of images collected through the external camera, that the object approaches the vehicle, outputs sound, inducing the pet's relaxation, through a first output module provided inside the vehicle, on the basis of the determination, and outputs information, indicating the execution of the pet mode in progress, through a second output module provided on the exterior of the vehicle, on the basis of the determination.

10. The vehicle of claim 1, wherein, when the result of the monitoring by the sensor in the pet mode indicates that the amount of change in the pet's movement does not reach the reference range, the processor maintains a deactivated state of the ANC function, and transmits the state information corresponding to the pet's movement to the external terminal.

11. The vehicle of claim 1, wherein when the result of the monitoring by the sensor in the pet mode indicates that the amount of change in the pet's movement reaches or exceeds the reference range, the processor collects the pet's sound by activating a microphone provided inside the vehicle, determines, on the basis of the pet's collected sound and the amount of change in the pet's movement, that the pet is in an anxious state, and requests a call connection to the external terminal.

12. The vehicle of claim 1, further comprising:

a food dispenser that is provided inside the vehicle and communicates with the processor, wherein the processor determines, based on the result of the monitoring by the sensor in the pet mode, that the pet is in a hungry state, transmits a control signal for operating the food dispenser on the basis of the determination, and outputs a voice inducing pet feeding by activating an audio output unit provided inside the vehicle.

13. The vehicle of claim 1, wherein, in a case where the pet mode is executed on the basis of the preset input in a state where the vehicle travels, the processor executes control in such a manner that the state information corresponding to the pet's movement is displayed on a display inside the vehicle.

14. A method of operating a vehicle, the method comprising:

a step of receiving, by a processor provided inside the vehicle, a signal corresponding to a preset input in a state where the vehicle is parked or stopped;

a step of activating a sensor for monitoring a pet's movement on the basis of the received signal and executing a pet mode for monitoring the pet's state;

a step of determining, based on the result of the monitoring by the sensor in the pet mode, that an amount of change in the pet's movement reaches or exceeds a reference range; and a step of activating an active noise cancellation (ANC) function equipped in the vehicle on the basis of the determination and transmitting state information corresponding to the pet's movement to an external terminal that is registered.

15. The method of claim 14 further comprising, before the step of receiving the signal:

a step of detecting a locked state of the vehicle and activating the sensor;

a step of transmitting alert information to the external terminal in response to detection of the pet's movement based on the result of the monitoring by the sensor; and a step of maintaining an activated state of the sensor and executing the pet mode when a response signal to the alert information is received.

16. The method of claim 14, further comprising:

a step of activating an external camera of the vehicle and thus monitoring whether or not an object in the vicinity of the vehicle approaches the vehicle, when the result of the monitoring by the sensor in the pet mode indicates that the amount of change in the pet's movement reaches or exceeds the reference range;

a step of determining, on the basis of images collected through the external camera, that the object approaches the vehicle; and a step of outputting sound, inducing the pet's relaxation, through a first output module provided inside the vehicle on the basis of the determination and outputting information, indicating the execution of the pet mode in progress, through a second output module provided on the exterior of the vehicle on the basis of the determination.

17. An in-vehicle pet monitoring device comprising:

an interface unit that performs communication with at least one of components provided in a vehicle; and a processor that, on the basis of a preset input in a state where the vehicle is parked or stopped, activates a sensor for monitoring a pet's movement and executes a pet mode for monitoring the pet's state, wherein the processor determines, based on the result of the monitoring by the sensor in the pet mode, that an amount of change in the pet's movement reaches or exceeds a reference range, generates a control signal for activating an active noise cancellation (ANC) function equipped in the vehicle on the basis of the determination, transmits the generated control signal to the vehicle through the interface unit, and transmits state information corresponding to the pet's movement to an external device that is registered.

* * * * *